United States Patent
Polichar et al.

(10) Patent No.: US 7,260,255 B2
(45) Date of Patent: Aug. 21, 2007

(54) MEASURING LINEAR SEPARATIONS IN DIGITAL RADIOGRAPHS

(75) Inventors: Raulf M. Polichar, San Diego, CA (US); Gary M. Rush, San Diego, CA (US); Scott T. Smith, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 616 days.

(21) Appl. No.: 10/840,652

(22) Filed: May 7, 2004

(65) Prior Publication Data

US 2005/0135668 A1 Jun. 23, 2005

Related U.S. Application Data

(60) Provisional application No. 60/531,660, filed on Dec. 23, 2003.

(51) Int. Cl.
*G06K 9/00* (2006.01)
(52) U.S. Cl. .................. 382/132; 382/141; 382/143
(58) Field of Classification Search ............... 382/132, 382/141, 143
See application file for complete search history.

(56) References Cited

U.S. PATENT DOCUMENTS 5,361,307 A * 11/1994 Hartley et al. .............. 382/278
5,982,915 A * 11/1999 Doi et al. .................... 382/130
5,999,591 A * 12/1999 Kobayashi et al. ......... 378/163

* cited by examiner

*Primary Examiner*—Matthew C. Bella
*Assistant Examiner*—Tom Y. Lu
(74) *Attorney, Agent, or Firm*—Banner & Witcoff, Ltd.

(57) ABSTRACT

Digital pixel data is obtained from radiographic imaging of one or more objects, and corresponds to an imaged area containing a feature to be measured. A data profile for a region around the measured feature is created from the digital pixel data. A reference profile is then created from the data profile. The reference profile represents an expected data profile for a reference condition of the objects, and accounts for the point spread function of the imager. The difference between the data profile and the reference profile is calculated. Based on that difference, the degree by which the actual condition of the objects varies from the reference condition is determined. The calculated difference can be compared to a lookup table mapping previously calculated differences to degrees of variation from the reference condition. The calculated difference can also be used as an input to an experimentally derived formula.

29 Claims, 39 Drawing Sheets

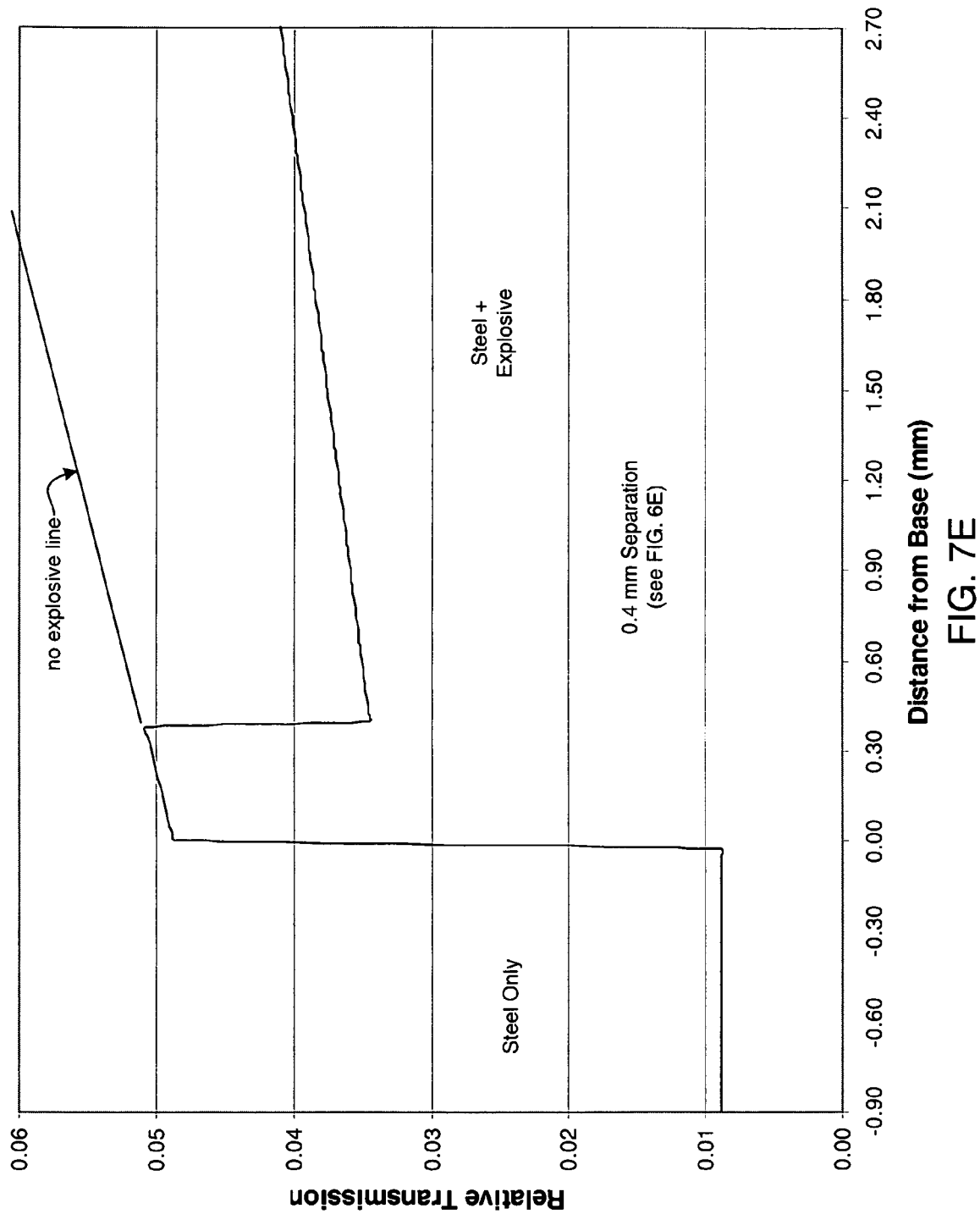

MEASURING LINEAR SEPARATIONS IN DIGITAL RADIOGRAPHS

CROSS-REFERENCE TO RELATED APPLICATIONS

This application claims the benefit of U.S. Provisional Application Ser. No. 60/531,660, filed Dec. 23, 2003, titled "A Measurement Methodology to Determine Linear Separations Between Objects of Strongly Differing Densities in Digital Radiographs," hereby incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract number DAAE30-96-C-0013 awarded by the United States Army.

FIELD OF THE INVENTION

This invention relates to digital radiography. More specifically, the invention relates to methods for determining a separation between adjacent materials having a substantial difference in densities after those materials have been imaged in a digital radiograph.

BACKGROUND OF THE INVENTION

Radiographic imaging (or more colloquially, "X-ray" or "gamma ray" imaging) has become an important inspection tool in many scenarios, allowing non-destructive examination of regions that are otherwise inaccessible for viewing and/or measurement. The utility of this tool has been further enhanced through combination with electronic imaging. In particular, an inspected object may be illuminated with an energy source, and an image created using an array of imaging pixels. The pixels detect differing intensity levels resulting from passage of energy through the inspected object(s). The pixels convert those intensity levels to output signals, which are then converted to digital data. The pixel data can be electronically stored and processed to produce an image on a display screen or other device.

Digital radiographic imaging of certain objects presents numerous challenges. For example, when imaging adjacent objects that have significant differences in density, it is often difficult to accurately measure the separation between the objects when that separation is of the same order of magnitude as the pixel pitch of the imager. In certain applications, determining the existence of very small separations is critical. One example is the inspection of artillery shells, which include a metal casing having an interior cavity filled with an explosive. The explosive has a density similar to wax, i.e., significantly different from the density of the metal shell casing. To prevent the explosive from exploding prematurely, there must be little or no separation between the explosive and the base of the casing cavity.

A radiographic image of objects of significantly different densities will have major brightness changes in the region of transition between the objects. The human eye has difficulty distinguishing closely adjacent features of highly differing brightness. In particular, the eye tends to emphasize overall density changes while losing details resulting from the presence of a very small separation. Moreover, the finite point spread for the imager may be as large as or larger than the actual linear separation between the objects. The point spread accounts for the fact that, due to inherent limitations of imaging equipment, energy from a point source will be spatially distributed throughout a larger region of an image. As the size of a measured feature approaches the size of the point spread, the reliability of the measurement decreases.

SUMMARY OF THE INVENTION

The present invention addresses the above and other challenges associated with measuring linear distances in digital radiographs. In at least one embodiment, digital pixel data is obtained from radiographic imaging of one or more objects. The data corresponds to an imaged area containing a feature to be measured. In at least one embodiment, the measured feature is a linear separation between two objects having substantially dissimilar densities, and that separation is of the same order of magnitude as the standard deviation of the imager point spread function. A data profile for a region around the measured feature is created from the digital pixel data. A reference profile is then created from the data profile. The reference profile represents an expected data profile for a reference condition of the imaged objects, and accounts for the point spread function of the imager. The difference between the data profile and the reference profile is calculated. Based on that calculated difference, the degree by which the actual condition of the objects varies from the reference condition is determined. In some embodiments, the calculated difference is compared to a lookup table mapping previously calculated differences to degrees of variation from the reference condition. In other embodiments, the calculated difference is an input to an experimentally derived formula.

In a first embodiment, the invention includes a method for increasing measurement precision in digital radiography. The method includes receiving digital radiographic data for one or more objects. The method further includes creating a first data profile based on the received data, the first data profile corresponding to a selected region of the one or more objects and being associated with the actual condition of the objects. A second data profile is derived from the received data, and represents an expected data profile for the one or more objects when in a reference condition. A difference between the two profiles is calculated. Based upon that difference, a degree by which the actual condition of the one or more objects varies from the reference condition is determined. A second embodiment includes a computer-readable medium having instructions which, when executed by a processor, cause the processor to perform steps similar to those of the first embodiment.

These and other features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 7A-7G are hypothetical data profiles corresponding to FIGS. 6A-6F, without consideration of the point spread function of FIG. 5.

DETAILED DESCRIPTION OF THE PREFERRED EMBODIMENTS

Figure 1:
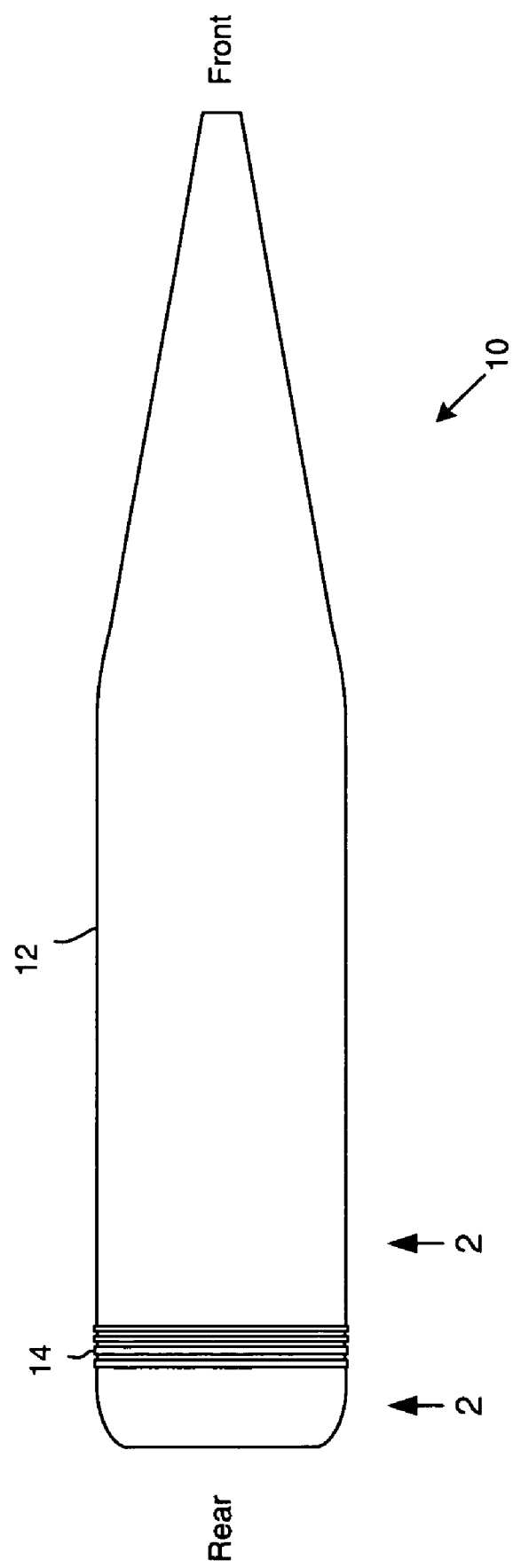
FIG. 1 is a partially schematic side view of a 155 mm artillery shell.

As used herein, "image" refers to a visual display of an object (or objects) created by illuminating the object(s) with energy and detecting passage of that energy through the object(s). "Image data" refers to the underlying data quantifying the amount of energy passing through a particular portion of the imaged object(s). Image data for multiple portions of the object(s) may be aggregated and otherwise processed to generate an image. In some embodiments, image data represents digitized values of energy intensity detected by individual pixels of a detection array. A data "profile" is an ordered set of data corresponding to a region of an object or objects. In some cases, a profile may be a set of actual data collected during imaging. In other cases, a profile may be a set of actual image data after averaging, normalization and/or other processing. In still other cases, a profile may be an expected set of data for a particular condition of the object(s).

Embodiments of the invention address challenges associated with radiographically imaging adjacent objects of dissimilar densities. In at least one embodiment, a first data profile is created for a region of interest in an image of the objects. The first data profile is associated with the actual condition of the objects. The first data profile is then used to create a reference data profile for the same region. The reference data profile represents an expected data profile for the same region when the objects are in a reference condition. Typically, the reference condition will be different from the objects' actual condition. The reference data profile is compared with the first data profile. Based on the comparison, the deviation of the actual condition from the reference condition is determined. In some embodiments, the reference condition is a zero separation between adjacent objects in a particular region, and the deviation of the actual and reference conditions corresponds to a separation between the objects.

In at least some embodiments, the invention further includes the step of creating two images displaced by one-half pixel separation length along a measurement axis. Using such displaced over-imaging combined with known digital filtering and enhancement techniques, a finer sampling pitch is achieved and the imaging point spread function is decreased along the measurement axis. Enhanced spatial frequency response along the measurement axis creates a greater change in shape of the overall image response, providing additional precision.

To provide an example and facilitate explanation, embodiments of the invention are described in the context of radiographically imaging a M795 155 mm artillery shell. In particular, at least one embodiment provides a method to measure a separation between a steel shell casing and an explosive contained in a shell cavity. However, persons skilled in the art will appreciate that the methods described herein have much wider applicability. For example, the described methods could be used to determine separation of solid rocket motor fuel within a case, or used in other industrial structures where a low density filling must be in contact with a higher density enclosure. Accordingly, the invention is not limited by the examples provided herein, and is instead defined by the claims following this detailed description.

FIG. 1 is a side view of a 155 mm artillery shell 10. Shell 10 is loaded into the breach of a howitzer (not shown) and then expelled through the howitzer barrel by detonating a propellant charge (not shown) placed at the rear of shell 10. Shell 10 has an outer steel casing 12. The forward portion of shell 10 contains an explosive charge 20 such as TNT (not shown in FIG. 1, but shown in FIG. 2). Attached to the outer surface of shell 10 is a brass rotation band 14. When shell 10 is fired, rotation band 14 engages fixtures with the howitzer so as to impart a spin upon shell 10 as it travels through the howitzer barrel. Separations between the explosive and shell housing can be compressed during launch causing adiabatic heating of the entrained air in the gap. Under certain conditions, such heating can raise the temperature above the ignition level for the explosive causing premature explosions within the breach of the howitzer barrel with serious consequences to the gun and crew.

Figure 2:
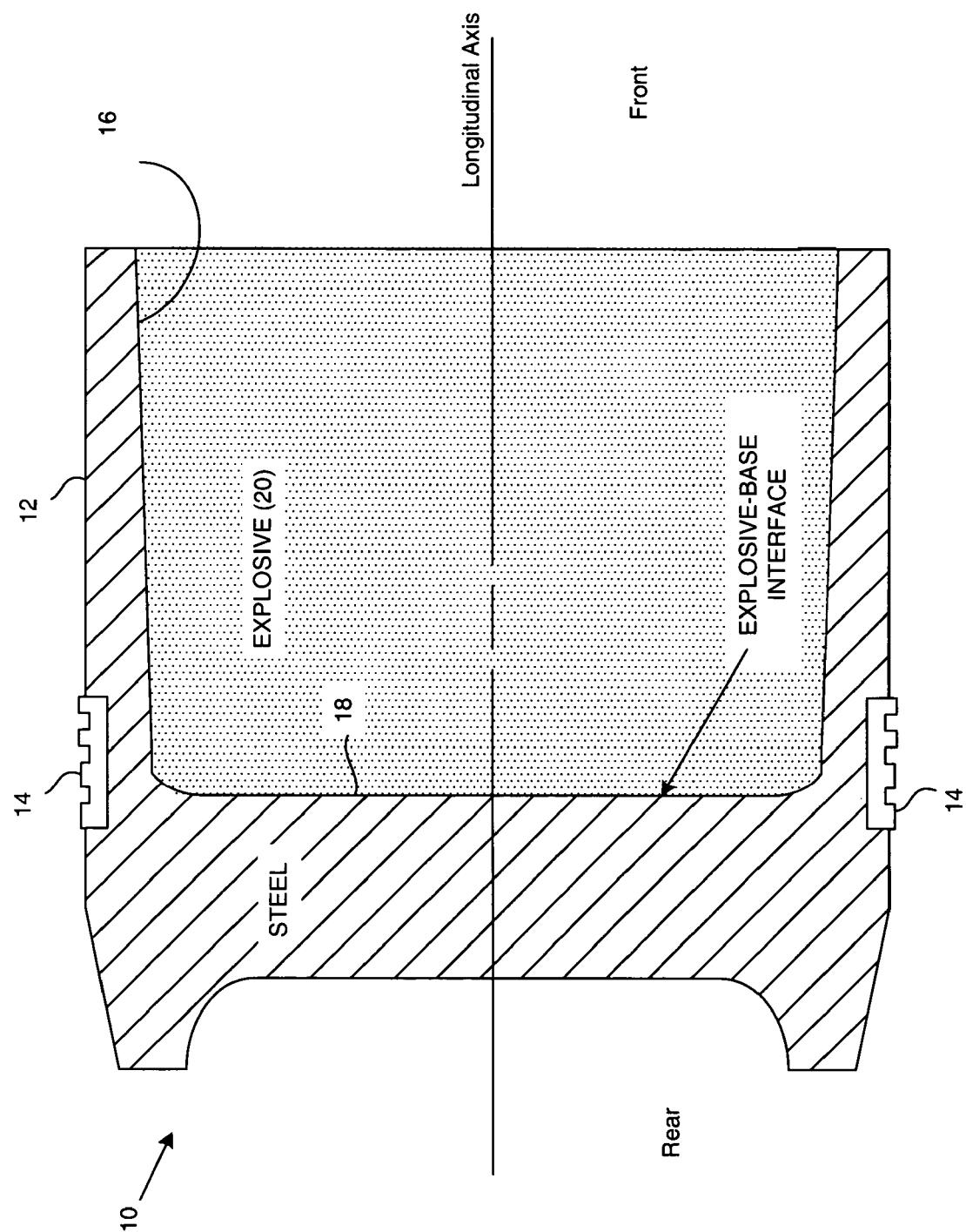
FIG. 2 is a partial cross section of the artillery shell of FIG. 1 exemplifying the problem of inspection between two regions of very differing density.

FIG. 2 is a partial cross-section of shell 10 taken along lines 2-2 of FIG. 1. Shell 10 is generally symmetric about its longitudinal axis. Explosive 20 fills cavity 16 of casing 12. Cavity 16 has an internal base surface 18 (hereafter, "base"). In order to avoid premature detonation of explosive 20 when shell 10 is fired, the separation between explosive 20 and base 18 must be zero or near-zero. Because casing 12 is formed by forging, there may be variation in the location of base 18 with regard to exterior dimensions of shell 10. Moreover, rotation band 14 is positioned on shell 10 such that is surrounds the section of shell 10 containing the interface between explosive 20 and base 18. Because of the aforementioned forging process and other manufacturing variations, the location of rotation band 14 relative to base 18 is often not precisely known.

Figure 3:
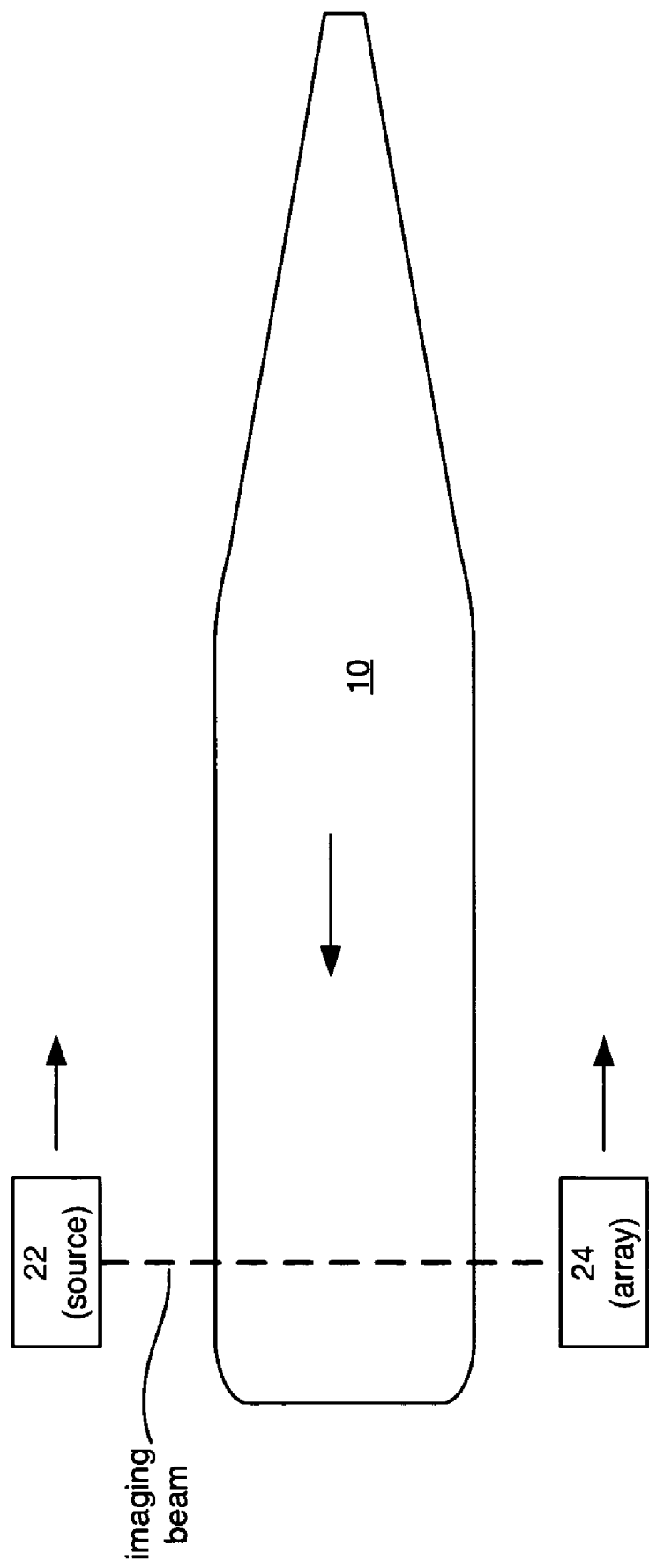
FIG. 3 is a partially schematic drawing of radiographic imaging of the artillery shell of FIG. 1.
Figure 4:
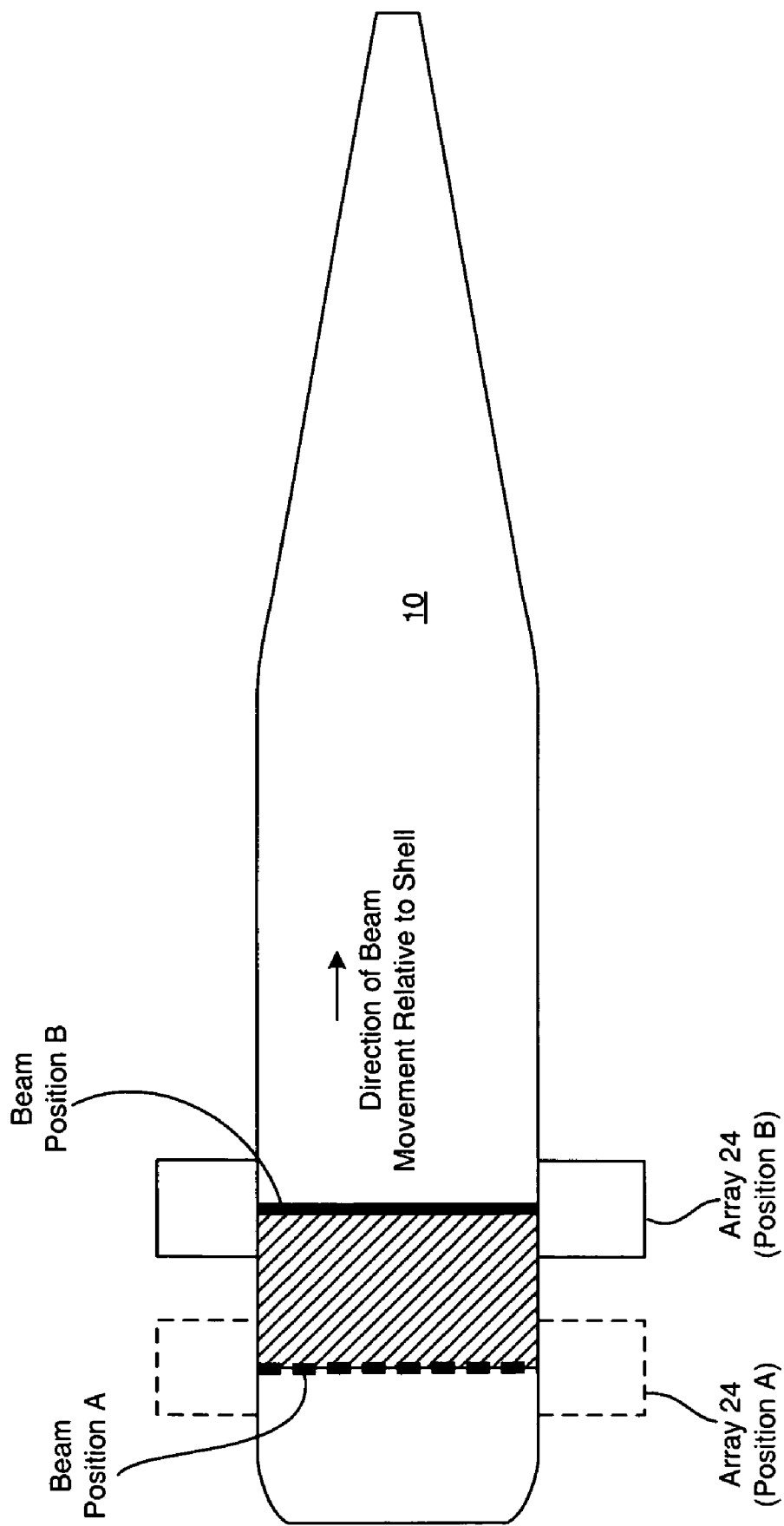
FIG. 4 is a view of the artillery shell of FIG. 3 from a different orientation.

In at least one embodiment, shell 10 is radiographically imaged as shown schematically in FIG. 3. Located on one side of shell 10 is an energy source 22. Pixel array 24 is located on the opposite side of shell 10. A beam of energy from source 22 passes through shell 10 and is received by pixel array 24. Based on the intensity of received energy, which in turn varies based on the density of the material in shell 10 through which the beam passes, pixels in array 24 provide image data. Image data from multiple pixels are then combined and processed to form an image that may be viewed on a display screen or other device. In order to minimize the effects of self scattering from adjacent portions of the beam being mixed into the transmission signal, the beam can be collimated sharply in one dimension. This collimated beam emitted by source 22 is narrow in the scanned dimension; in one embodiment, the beam is 100-150 pixels in width. In order to create an image of a larger portion of shell 10, shell 10 is moved relative to source 22 and array 24 as successive beam-width images are created. Using time delayed integration (TDI), the successive beam-width images are then combined into a single image of a larger area. FIG. 4 is a view of shell 10 from the point of view of source 22 in FIG. 3. The width of the beam from source 22 is represented schematically as darkened lines. The cross-hatched region represents an area of shell 10 imaged by creating individual beam-width images as the beam moves from position A (dashed line) to position B (solid line).

Figure 5:
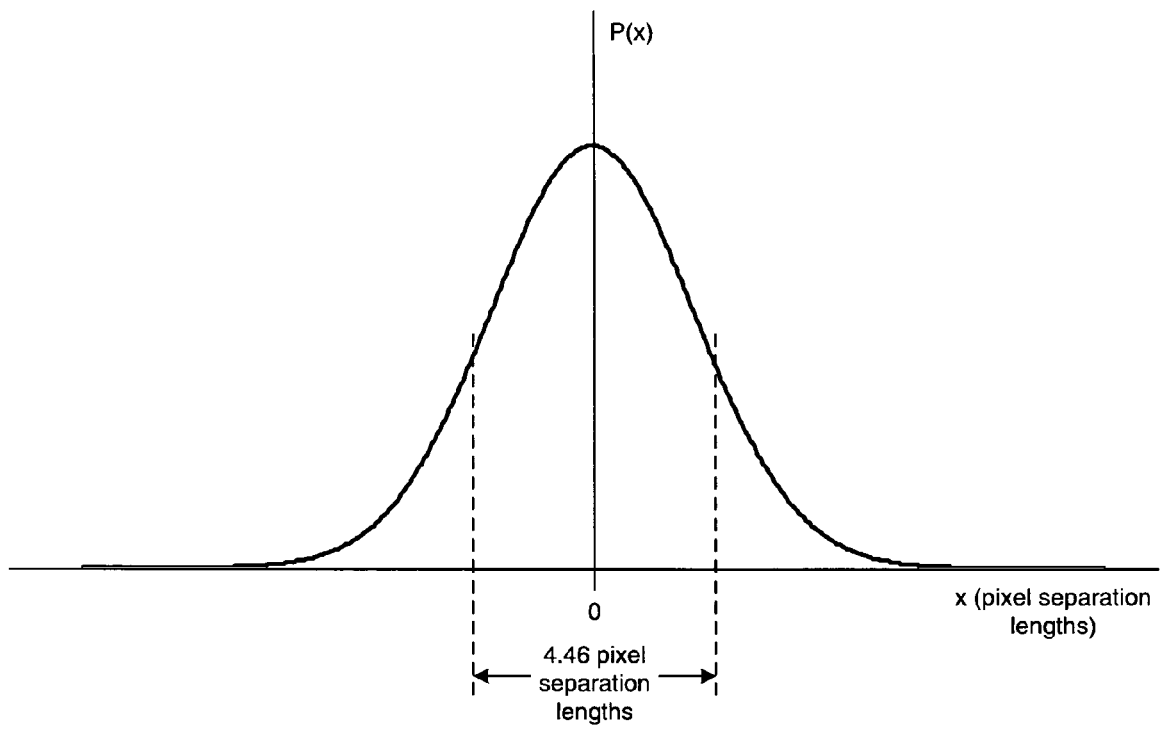
FIG. 5 is a graph of a point spread function P(x).
Figure 5A:
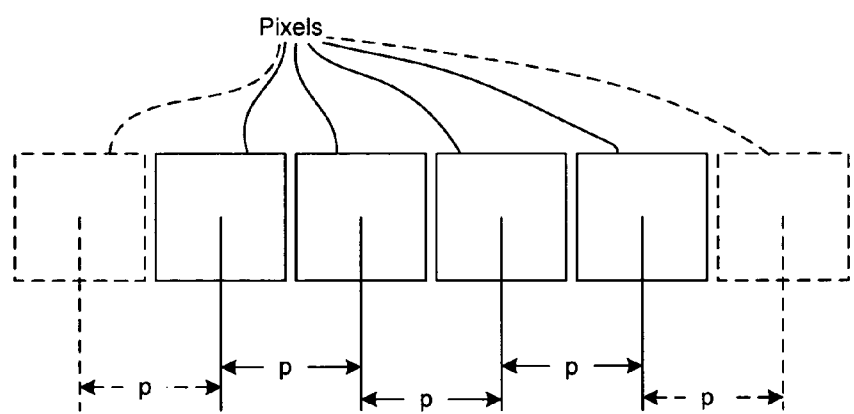
FIG. 5A is an illustration of pixel separation length.

In one embodiment, shell 10 is imaged using an array having a pixel pitch of 0.006 inches (0.15 mm) and a point spread function as shown in FIG. 5. As previously discussed, a point spread function accounts for limitations in the imaging equipment. In particular, the point spread function quantifies the amount by which energy from a point source will be spatially distributed (or "blurred") in an imaged region. In other words, and referring to FIG. 5, the energy emitted from a point located above the x axis at x=0 and pointing toward the x axis will be distributed along the axis as represented by the curve. The energy received by an array located on the x axis will be highest at x=0 and will drop off on either side of x=0. The point spread function of FIG. 5 is a Gaussian distribution with a standard deviation of approximately 1.9 pixel separation lengths and a full width at half maximum of 4.46 pixel separation lengths. As shown in FIG. 5A, individual pixels in an array are distributed such that there is a separation distance p between each pixel. This spacing (or pitch) is determinative of imager resolution. Often (though not always), pixels are contiguous squares, such that pixel width=pixel height=pixel separation length. When used to image the explosive/base separation of shell 10, 4.46 pixel separation lengths in a 0.15 mm resolution array corresponds to approximately 0.67 mm (4.46×0.15 mm) of blur in a visual depiction of the explosive-base interface. In other words, an image of the explosive-base interface region of shell 10 would be a blurred band whose half intensity points are approximately 0.67 mm wide. This is unacceptable resolution if separations less than this amount are to be directly measured. In other words, a sufficiently precise measurement of explosive-base separation cannot be obtained from visual interpretation or measurement of the actual image. Instead, further analysis of the underlying pixel array data is needed, as the desired measurement is of the same order of magnitude as a major portion of the point spread function.

In at least some embodiments, the image data is further analyzed by calculating a data profile for a reference condition of the imaged object(s). The object(s) may (and often will) be in a condition other than the reference condition when imaged. However, by comparing the reference profile to a data profile corresponding to the actual condition of the objects, the degree of variation from the reference condition can be more precisely determined.

Figure 6A:
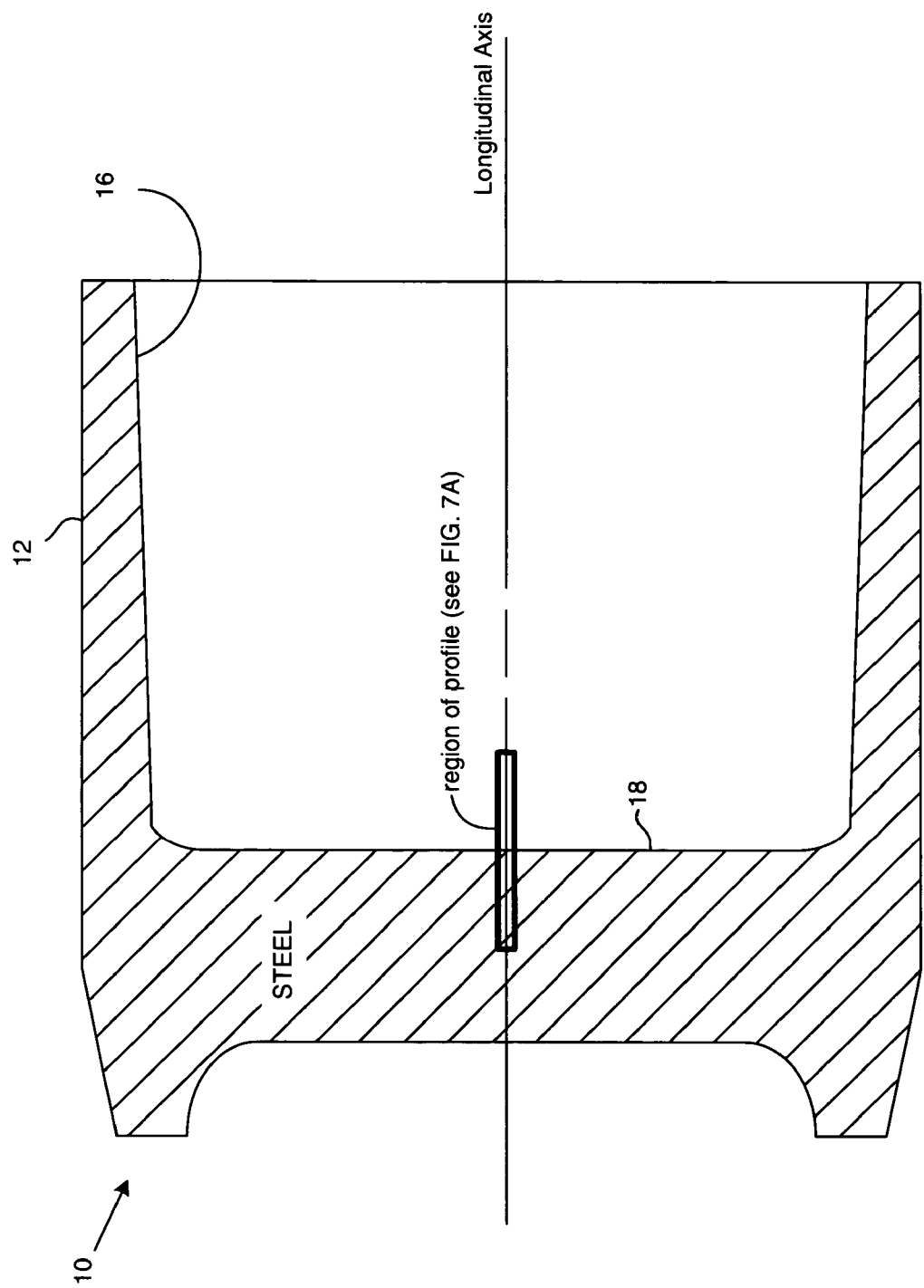
FIG. 6A is a simplified cross-section of the artillery shell of FIG. 2 without explosive or a rotation band.
Figure 6B:
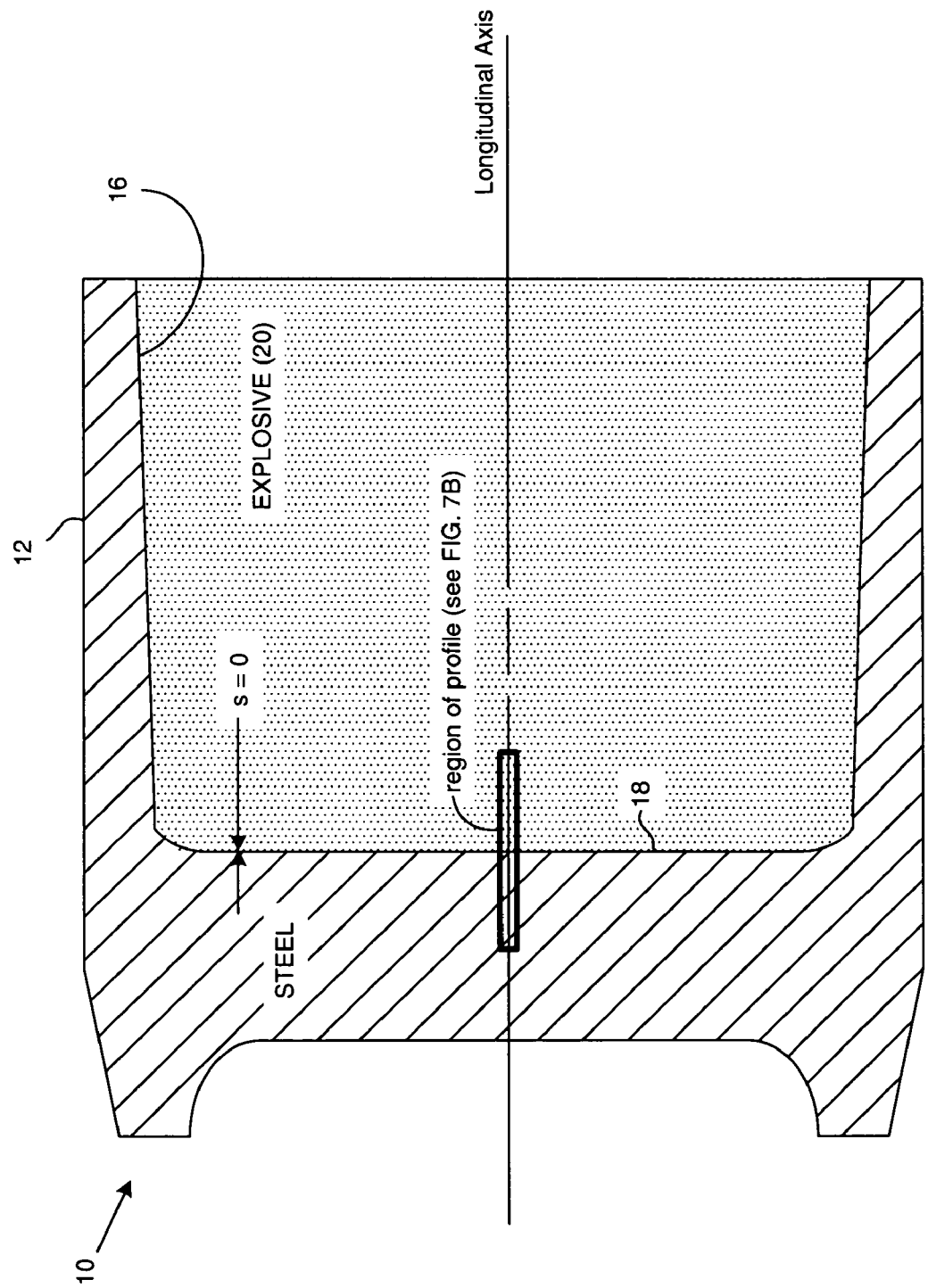
FIGS. 6B-6F are simplified cross-sections of the artillery shell of FIG. 2, without a rotation band, and with varying degrees of explosive-base separation.
Figure 6C:
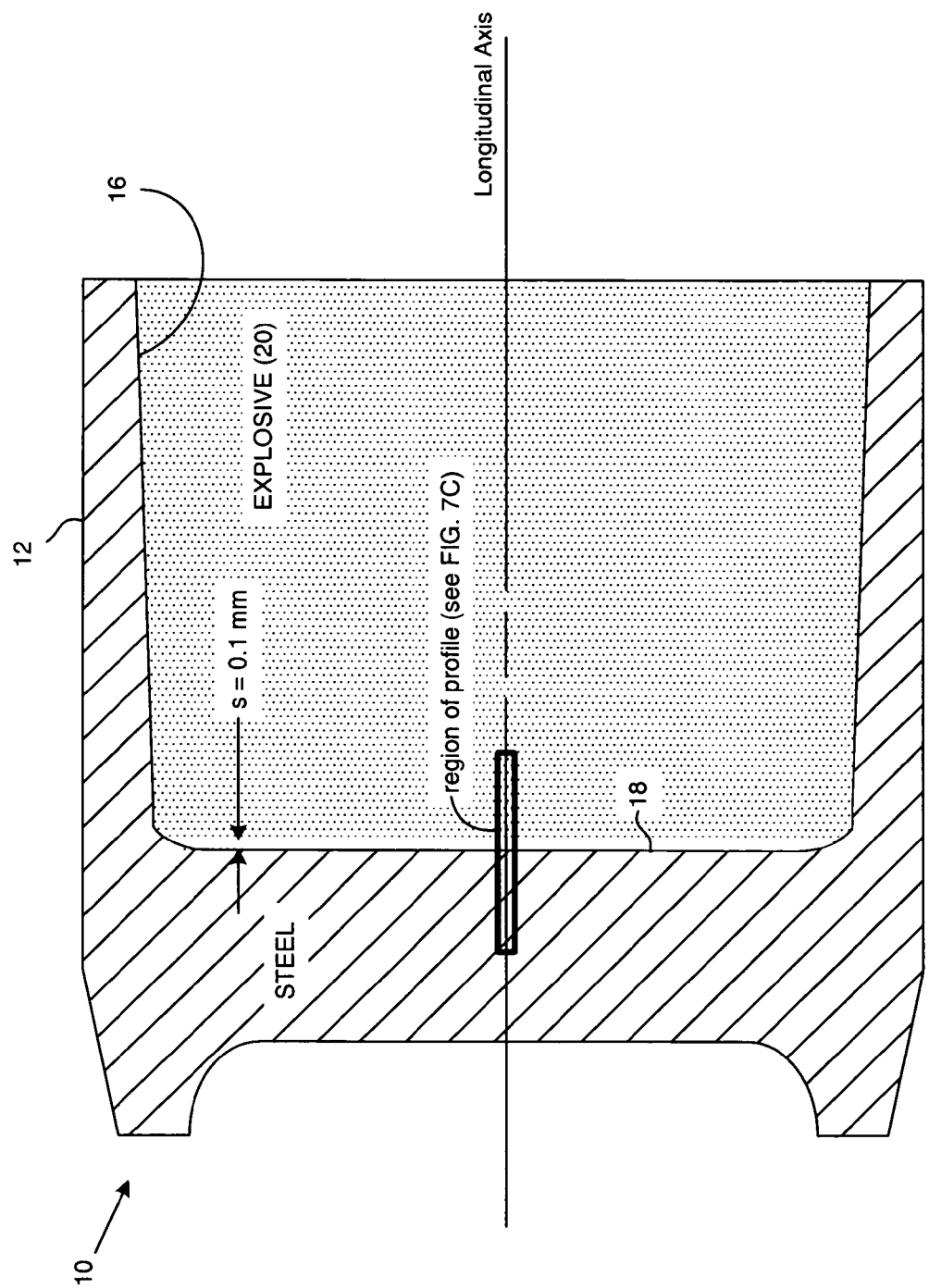
Figure 6D:
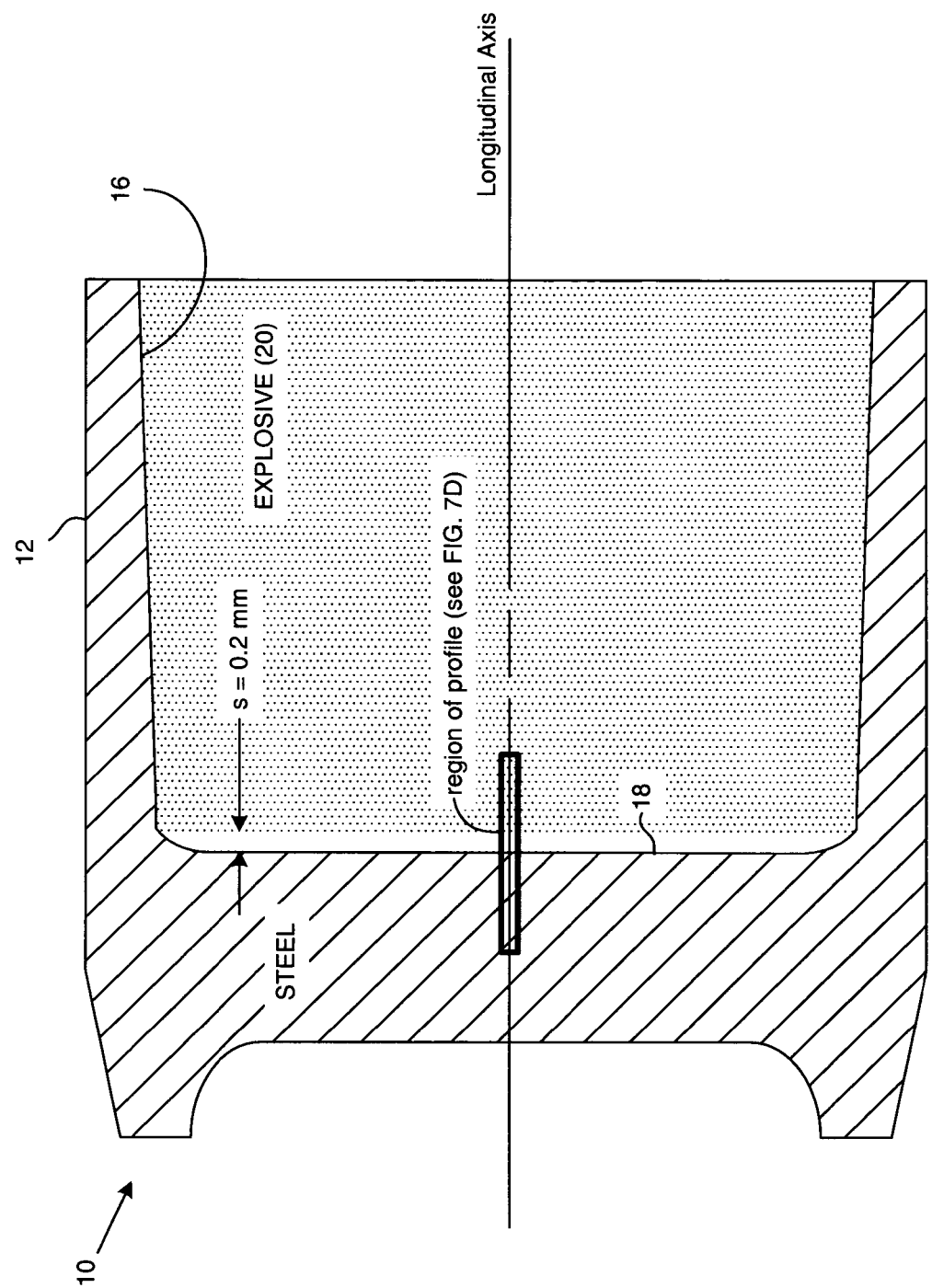
Figure 6E:
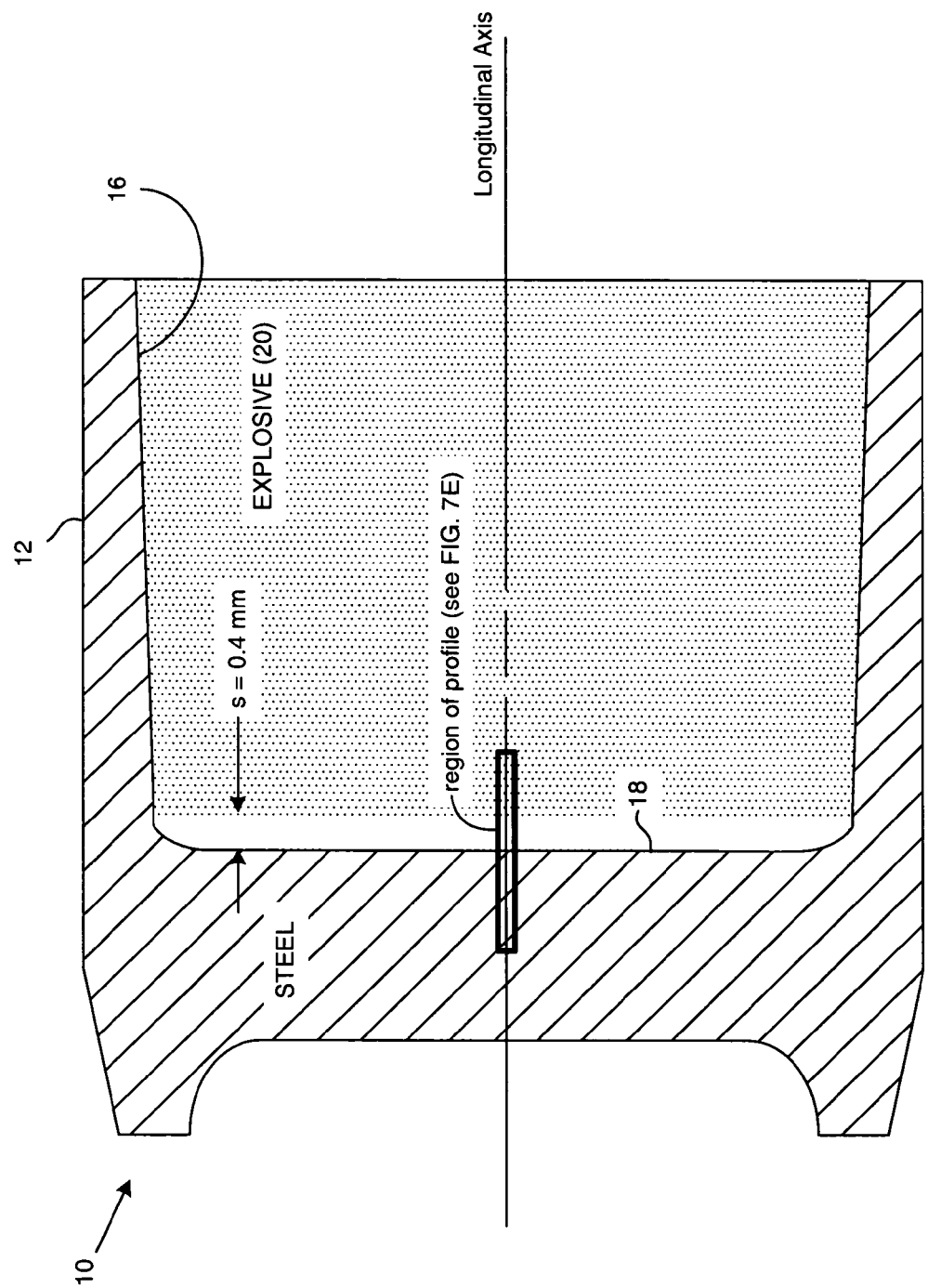
Figure 6F:
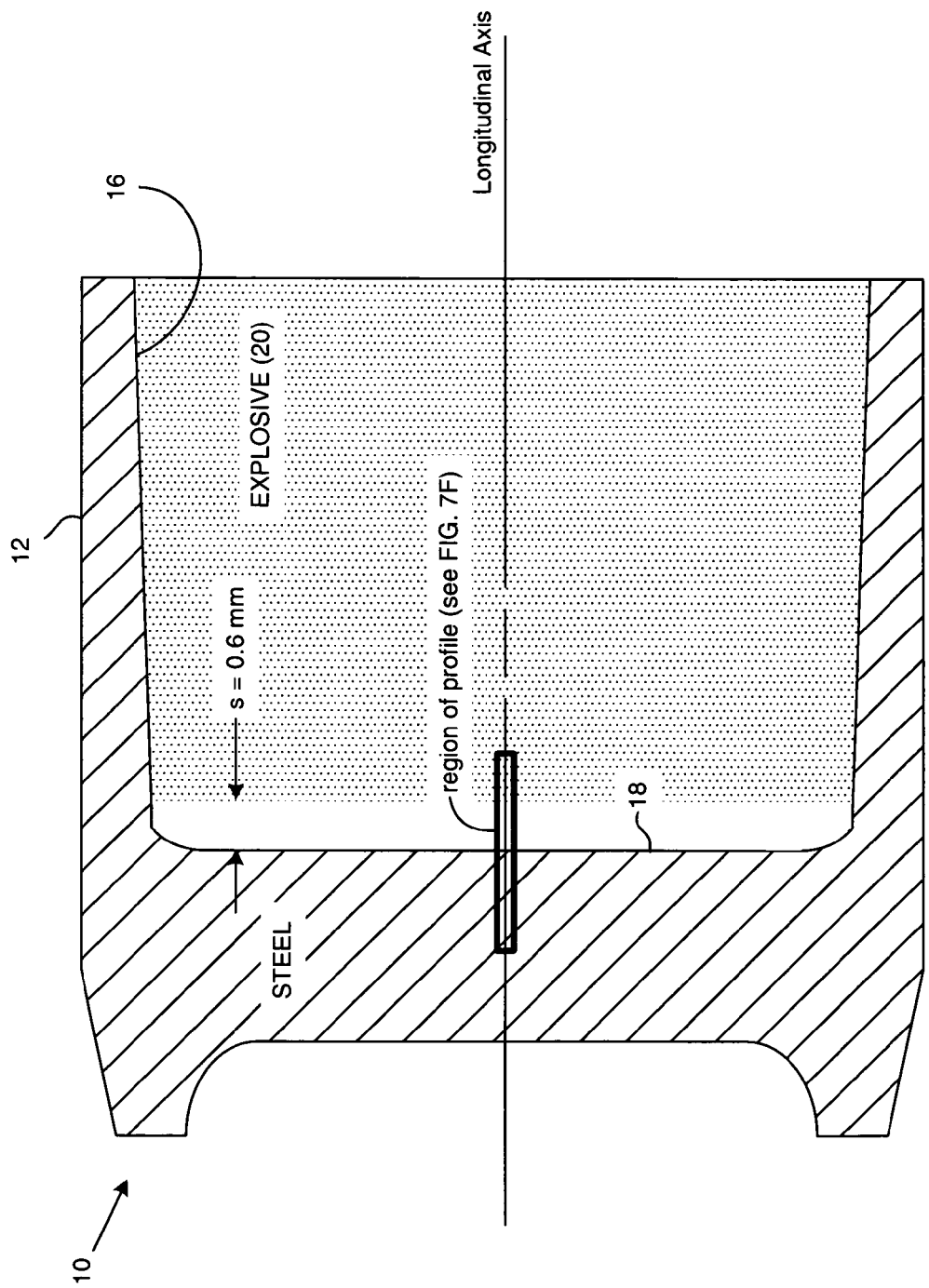

In at least one embodiment, the reference condition is a zero separation between objects of substantially different densities (e.g., explosive 20 and base 18 in FIG. 2). To create a reference profile for shell 10 corresponding to a zero explosive-base separation, the cross section of FIG. 2 is first simplified. FIG. 6A is similar to FIG. 1, but without rotation band 14; for illustration purposes, no explosive is shown in FIG. 6A. FIGS. 6B through 6F are similar to FIG. 6A, with each figure showing an example of an arbitrarily chosen separation distance s between base 18 and explosive 20. At the rear portion of shell 10, an imaging beam only passes through steel. As the imaging beam moves forward and reaches base 18, the beam begins passing through the steel walls of cavity 16 and through explosive 20. Because the walls of cavity 16 taper toward the front of shell 10, the beam passes through less steel as the beam moves forward. Equation (1) gives the attenuation of a beam passing through shell 10.

$$I/I_0 = \exp(-(\mu_{steel} * T_{steel} + \mu_{explosive} * T_{explosive})) \quad \text{Equation (1)}$$

The quantity $I/I_0$ in Equation 1 is the ratio of the intensity of energy emitted by source 22 to the intensity of energy received by array 24 (after transmission through shell 10). The variables $\mu_{steel}$ and $\mu_{explosive}$ are the linear attenuation coefficients for the transmission of X-rays through steel and through explosive. Linear attenuation coefficients for many materials are known and available from numerous sources. In other cases, the attenuation coefficient can readily be determined experimentally. The variables $T_{steel}$ and $T_{explosive}$ are, respectively, the thicknesses of steel and of explosive through which the beam from source 22 passes. The half intensity thickness $T_{1/2}$ equals 0.693 divided by the linear attenuation coefficient ($\mu$).

FIGS. 7A through 7F are hypothetical data profiles for pixel-width regions of FIGS. 6A through 6F based upon ideal physical dimensions for shell 10. Specifically, the profiles of FIGS. 7A-7F are plots of Equation 1, for different values s of explosive-base separation (or for no explosive), in a 1-pixel wide region beginning slightly behind base 18 and ending slightly forward of base 18. The region is generally shown as a bold-lined box in FIGS. 6A through 6F.

Figure 7A:
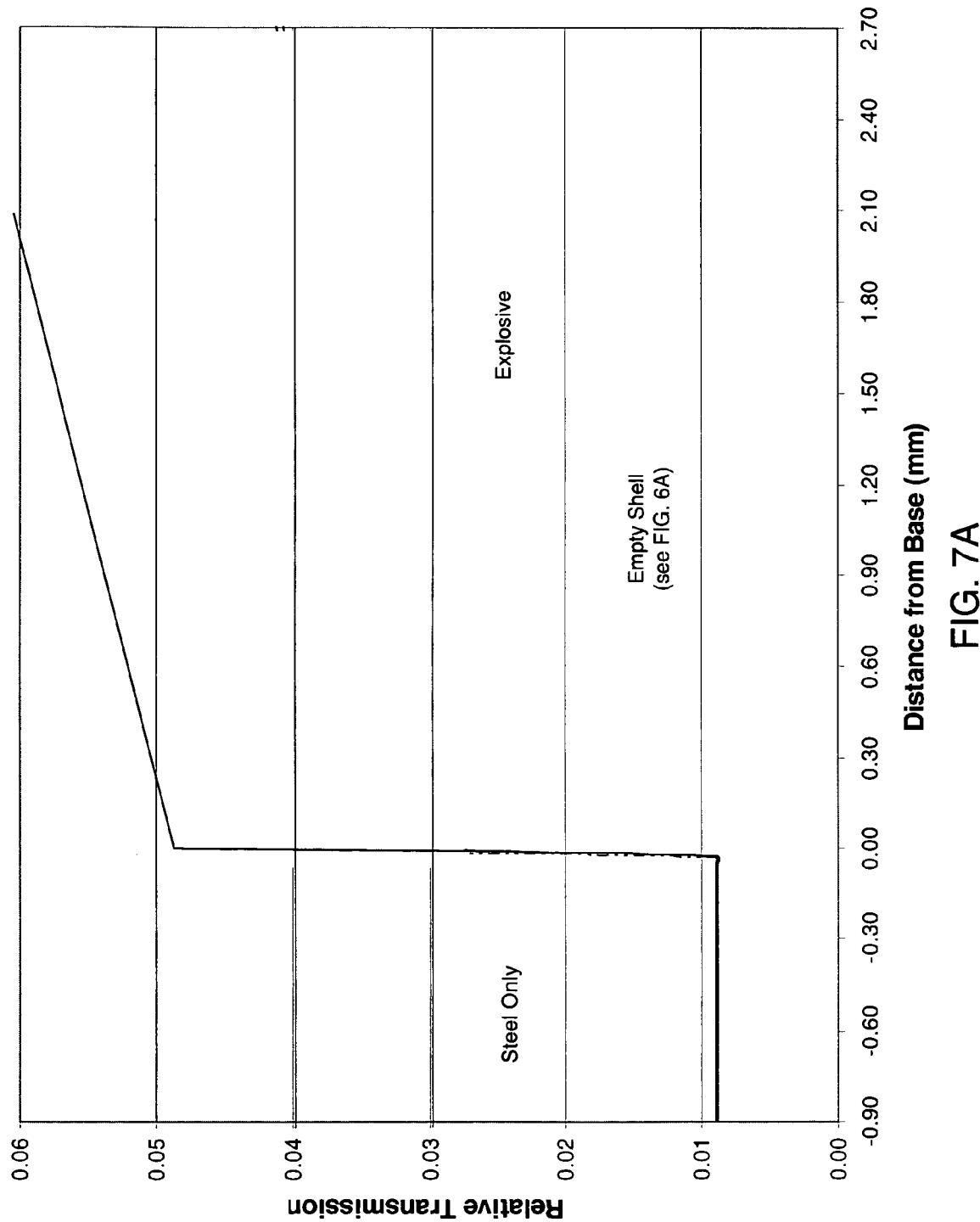
Figure 7B:
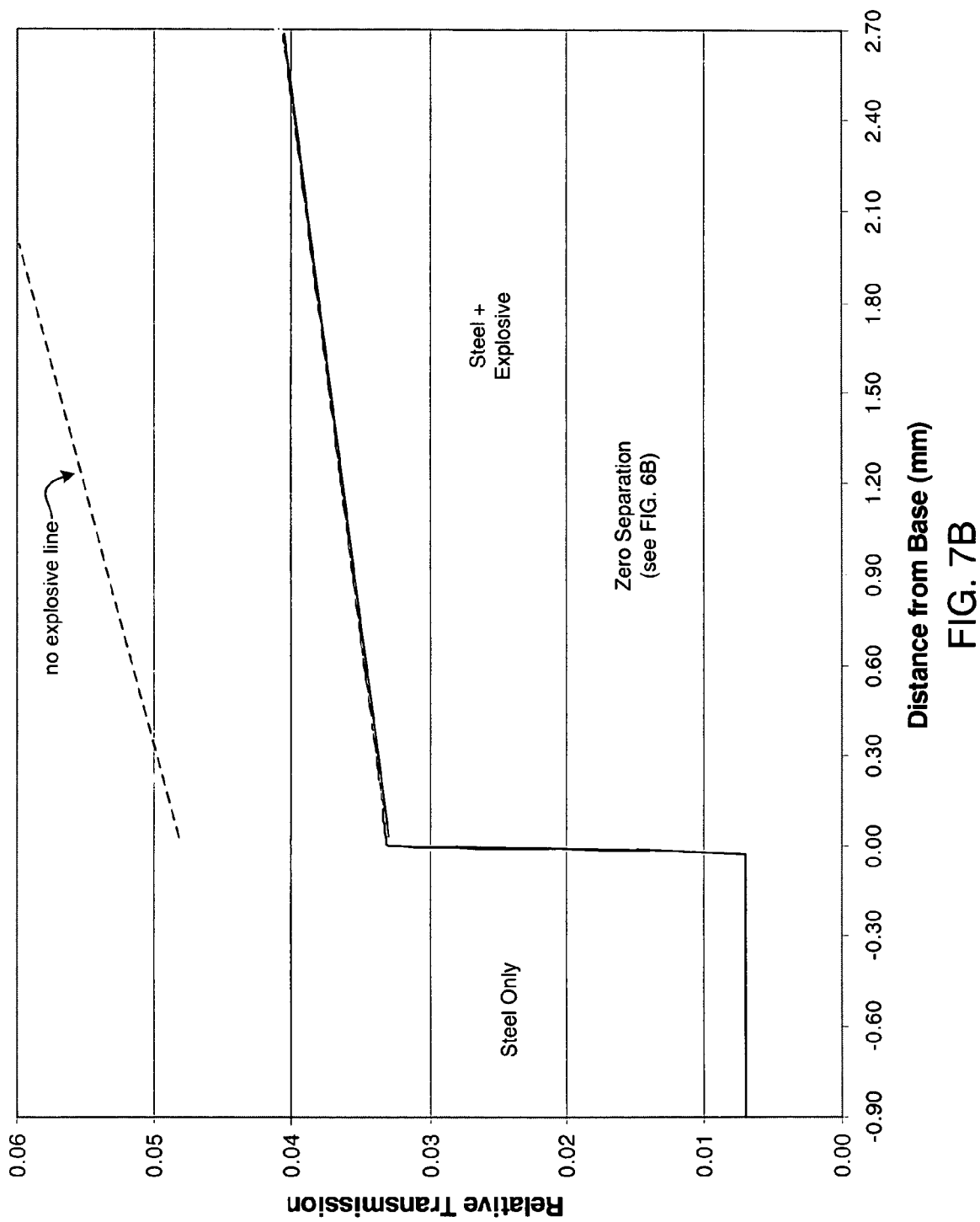
Figure 7C:
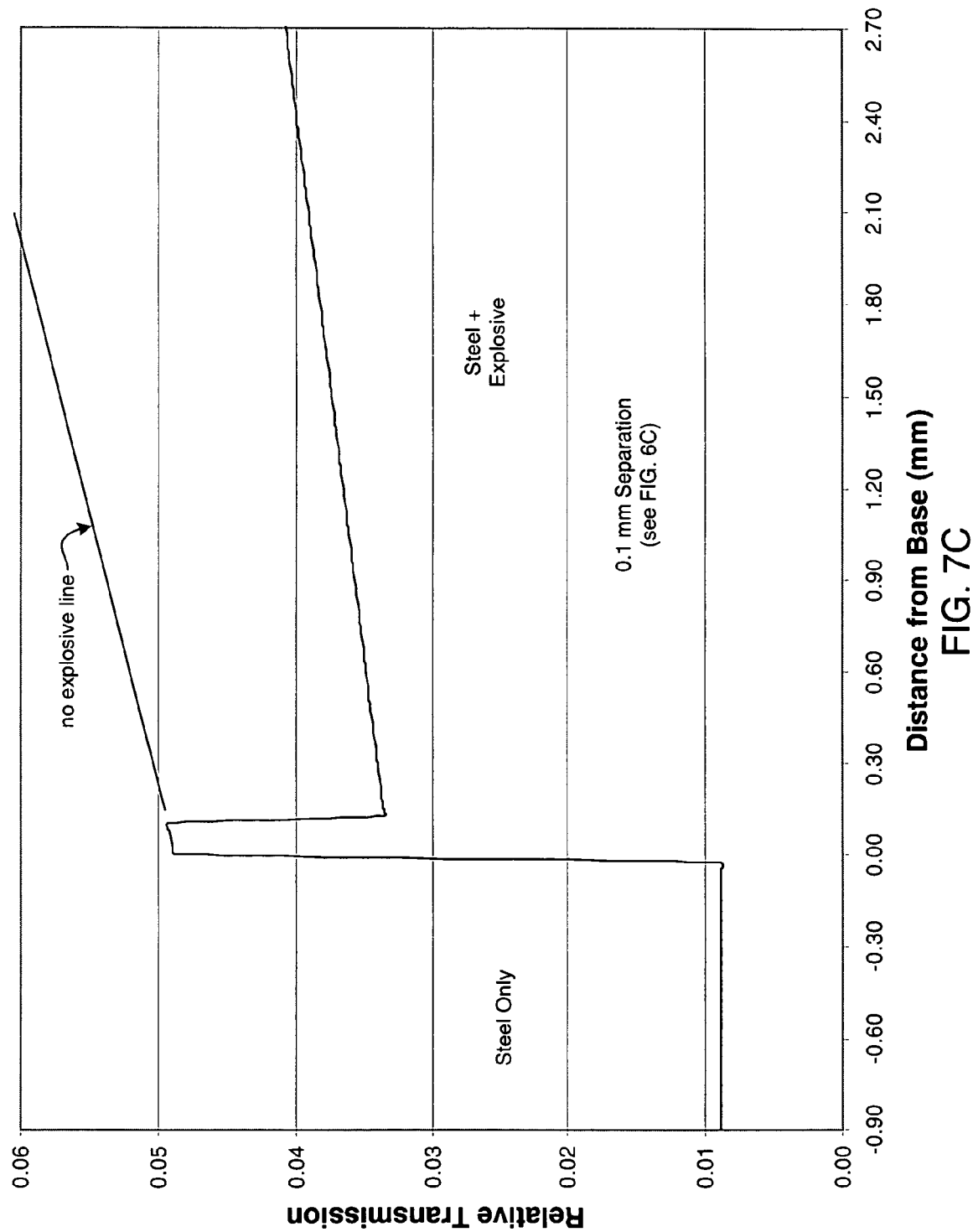
Figure 7D:
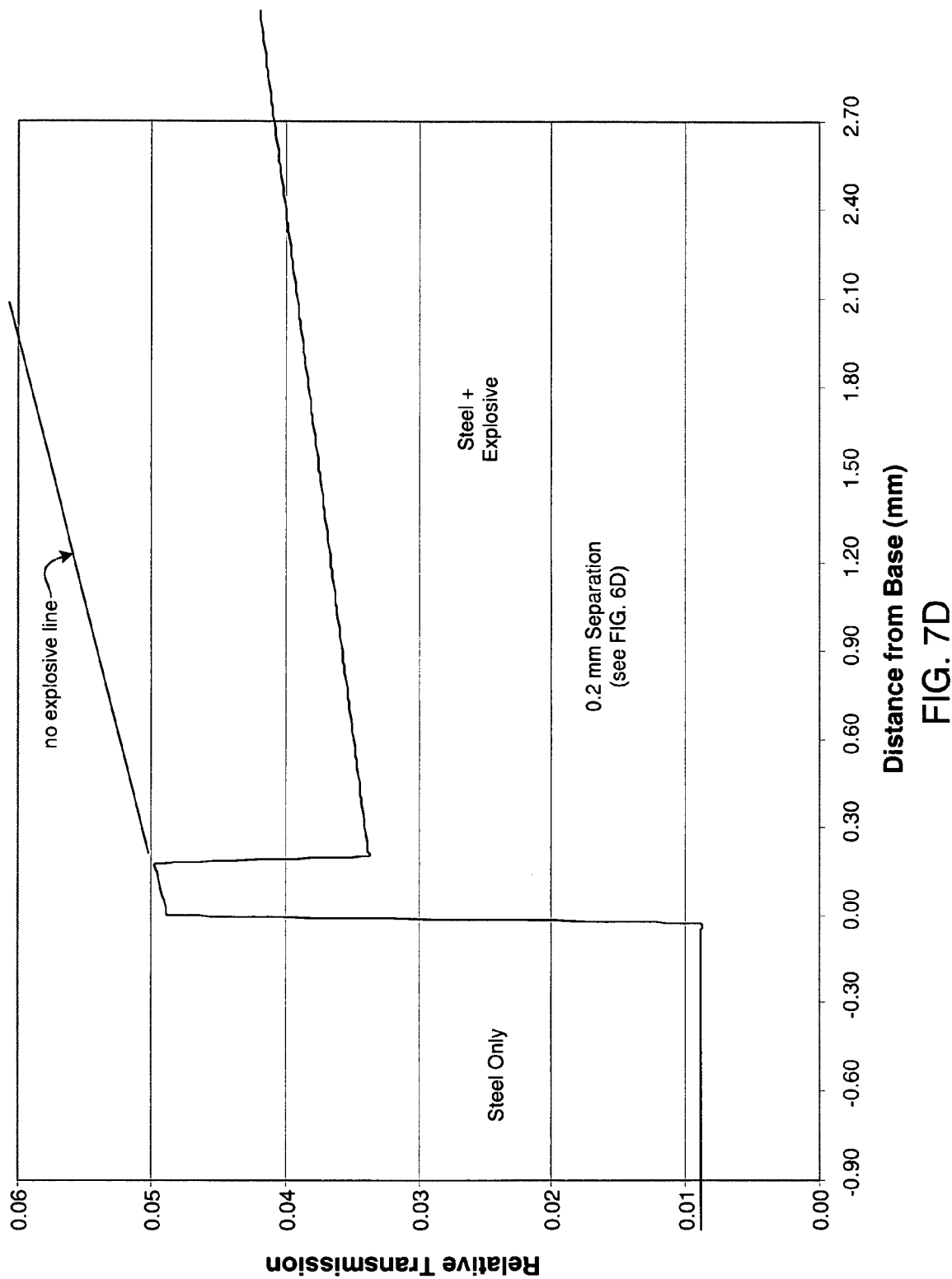
Figure 7F:
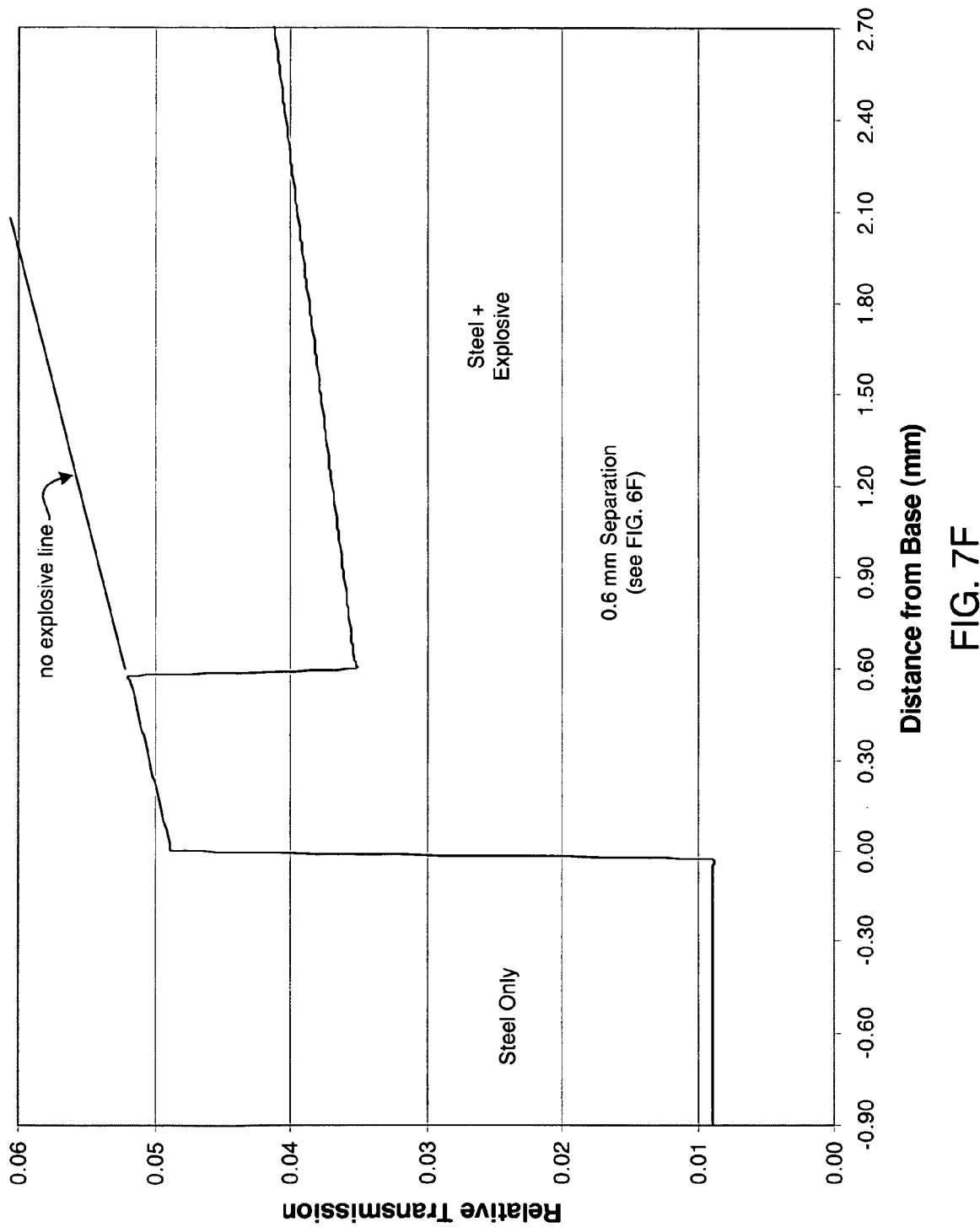

Values for $T_{steel}$ and $T_{explosive}$ are obtained from engineering drawings providing ideal dimensions for shell 10 at various locations along the longitudinal axis of the shell. The profile of FIG. 7A is for an empty shell, i.e., without any explosive in cavity 16 (as shown in FIG. 6A). Each of the profiles in FIGS. 7B through 7F assumes a single value for s over the entire explosive-base interface. For each profile, the transmission attenuation $I/I_0$ is generally constant in the steel region behind the base and linear in the mixed steel and explosive region. For the empty shell of FIG. 6A (substituting $\mu_{air}=0$ for $\mu_{explosive}$), the profile of FIG. 7A consists of a nearly flat line in the region behind the cavity base (corresponding to the generally constant thickness of the shell in that region as the beam moves along the longitudinal shell axis) and an offset sloped line (corresponding to the tapered walls of the shell forward of the cavity base). The profile of FIG. 7B is similar for a filled shell ($\mu_{explosive}>0$) with separation s=0, but with a smaller offset between the steel and steel+explosive lines. Between these two extremes are the profiles for various non-zero values of explosive-base separation s, as shown in FIGS. 7C-7F. Specifically, each profile in FIGS. 7C-7F initially rises to the no-explosive line and then falls to the steel+explosive line; the distance before fall to the steel+explosive line increases as explosive-base separation increases. Because blurring from the point spread function of FIG. 5 is ignored in FIGS. 7A through 7F, each of those profiles is a step function of increasing width. For comparison purposes, FIG. 7G shows all profiles from FIGS. 7A-7F on a single plot.

Figure 7G:
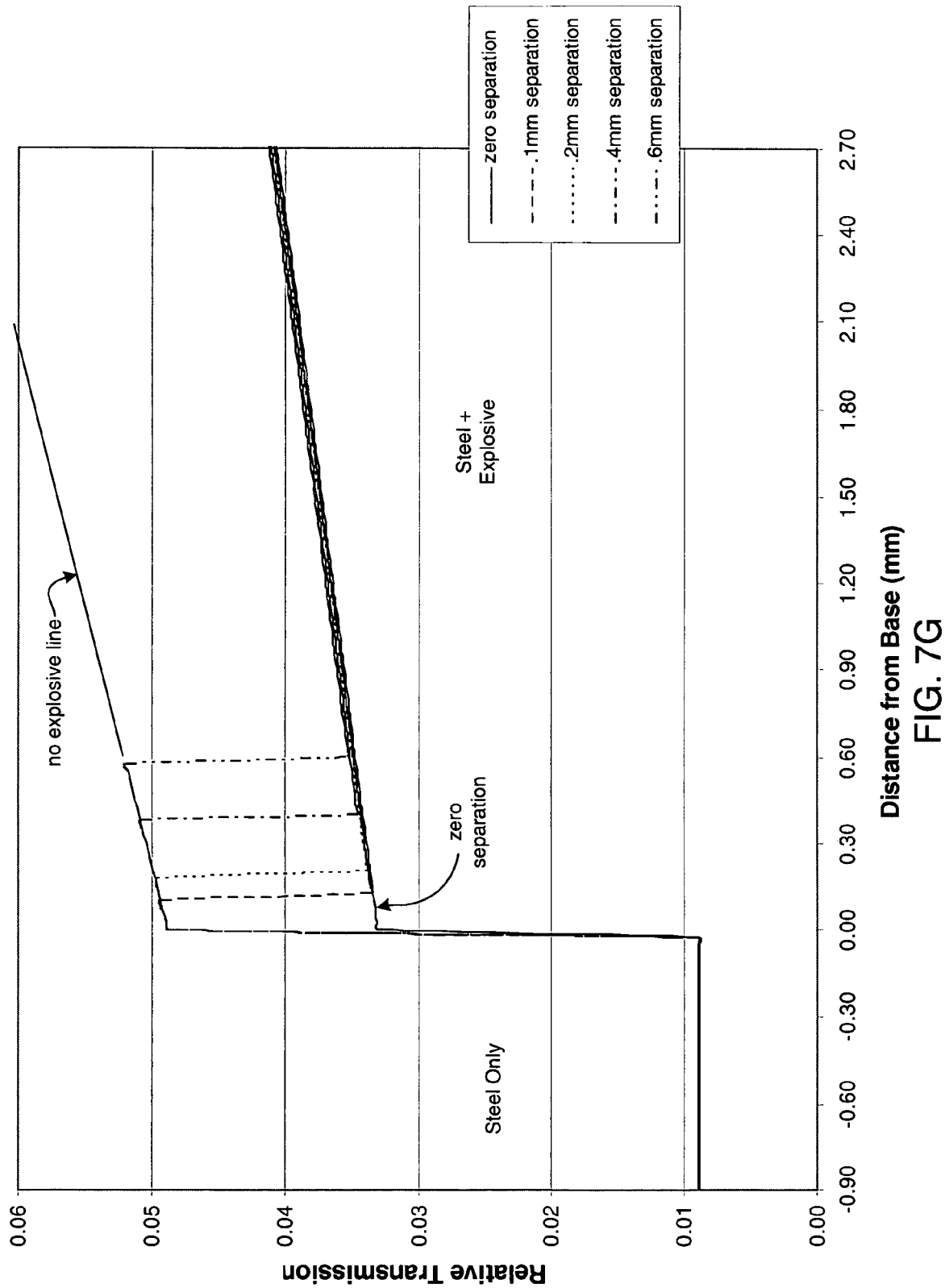
Figure 8:
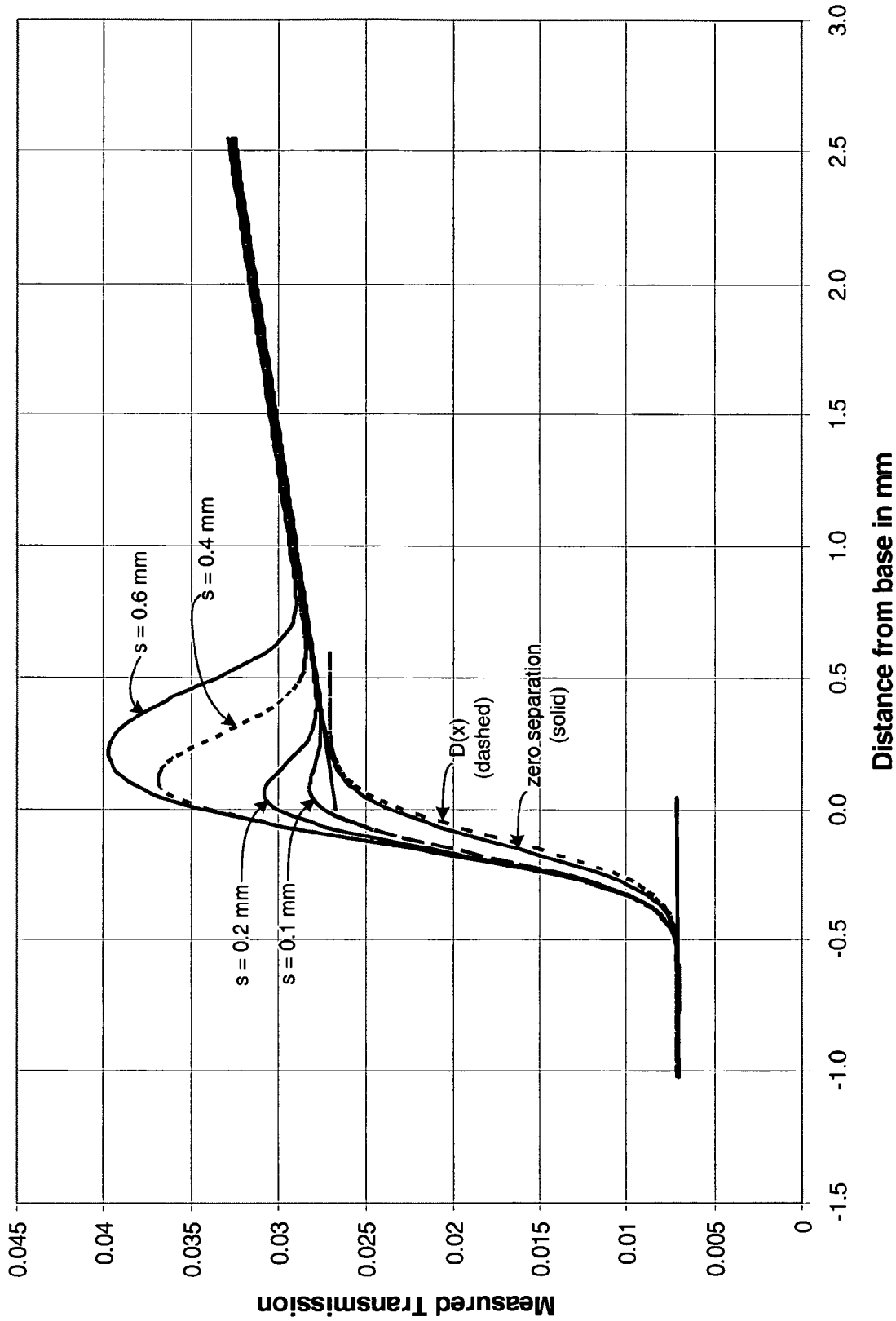
FIG. 8 is a composite plot of the data profiles of FIG. 7G after convolution with the point spread function of FIG. 5.

FIG. 8 convolves the effect of the imager point spread function (FIG. 5) onto the profiles of FIG. 7G. Specifically, the Gaussian curve of FIG. 5 is convolved with each of the profiles of FIG. 7G. Also included in FIG. 8 is a curve D(x) representing the integral of the P(x) curve of FIG. 5. The D(x) curve is overlaid upon the convolution of the zero separation (s=0) curve from FIG. 7G with the point spread function of FIG. 5 to show that the expected shapes are very closely approximated by the net effect of only the point spread function itself. The D(x) curve is included to emphasize that for a perfect interface, the resulting profile shape is almost totally dominated by the imager's response function. Each of the profiles in FIG. 8 represents an expected data profile for an ideal shell (i.e., assuming ideal physical dimensions) having the explosive-base separation value corresponding to the profile. The relative shapes and positions of these curves indicate degrees of variation from a s=0 reference condition. For example, the expected profile for an ideal shell with a 0.6 mm separation would be farther from the zero separation curve than would a profile for a 0.4 mm separation.

The usefulness of the profiles in FIG. 8 is understood by hypothetical example. If an image were taken of an ideal-dimensioned shell with an unknown explosive-base separation s, a data profile for a region straddling the explosive-base interface could be generated. Specifically, a region of the image straddling the blurred explosive-base interface could be selected, and pixel data for that region obtained. The difference between this data profile and the zero-separation profile of FIG. 8 could then be determined. This difference could then be compared to previously calculated differences between the zero-separation profile and profiles for known separation distances. Based on that comparison, the unknown separation distance s could be determined with greater precision than would be possible from visual inspection of the image itself.

Figure 9:
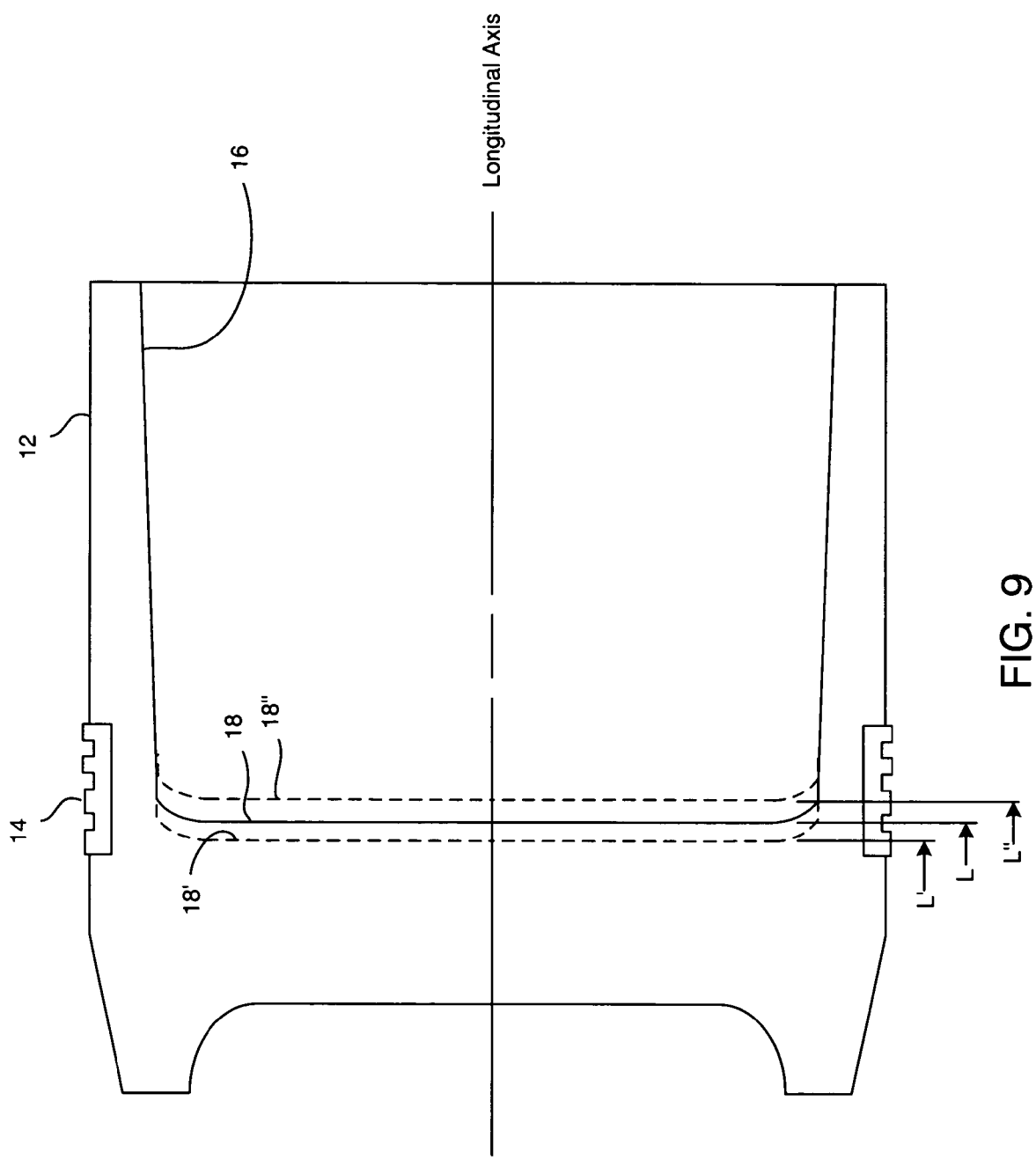
FIG. 9 is a cross section of an artillery shell similar to that of FIG. 2, but showing variation in base location.

As mentioned above, however, manufacturing processes can cause significant dimensional variations in the steel portions of individual shells. As shown in FIG. 9, the cavity base for a given shell may be offset along the longitudinal axis from the ideal location. Attempting to precisely locate the longitudinal location of the base using an external shell reference point (e.g., the tip of the shell) is impractical. If the location of the base is not accurately known, comparing an image profile for an actual shell to a zero-separation profile based on an ideal shell can induce inaccuracy. In other words, for a particular base-explosive separation s, the zero-and s-separation profiles for an ideal shell having base 18 located at L may not have the same relationship as the zero-separation and s-separation profiles for an actual shell having base 18' located at L', or having base 18" located at L". Other dimensional variations could also affect accuracy. For example, the thickness and taper of the cavity wall may vary from shell to shell. If the thickness and taper varies from that of an ideal shell, the slope and offset of the steel+explosive portion of the profile could change. If the steel+explosive line changes, the shape and location of the zero-separation curve could also change.

To compensate for the dimensional variation among shells, actual image data from a shell for which (a potentially non-zero) explosive-base separation is being measured is used to generate a reference profile for that shell. In other words, the actual data from a shell image (which data is inherently affected by dimensional variations of that shell) is used to develop an expected data profile for that same shell having a zero explosive-base separation. As seen in FIG. 8, the general shape of the expected data profile for a zero-separation reference condition is known. Specifically, the expected profile will have generally straight lines for the steel and steel+explosive regions, with a curve joining those lines in the region of the explosive-base interface. That curve will be similar in shape to an integrated Gaussian curve (specifically, the integral of the point spread function for the imager).

In order to properly locate the integrated Gaussian curve within a reference profile, a height H and centroid M for that integrated Gaussian curve are needed. Of these two dimensions, centroid location is more critical in at least one embodiment. In that embodiment, a first estimate for centroid location is derived from the first derivative of the actual image data profile. In particular, the image data profile is treated as though it were the simple integral of a Gaussian shaped curve. If the data profile were actually a simple integral of the Gaussian point spread function P(x) (FIG. 5), then the point spread function would be centered at the point of the baseline. Normally, the midpoint of an integrated Gaussian curve corresponds to the center of the Gaussian itself, and the integrated Gaussian would thus also be centered on the base location. Moreover, the center of a Gaussian curve (the mean M) corresponds to the maximum of that Gaussian curve. This is shown in Equation (2), the formula for a Gaussian distribution having unit area, standard deviation $\sigma$ and mean M.

$$P(x) = \frac{1}{\sigma\sqrt{2\pi}} e^{-(x-M)^2/(2\sigma^2)} \qquad \text{Equation (2)}$$

Thus, by calculating a numerical derivative for the data profile and finding a maximum value, the base location could be found.

Figure 10:
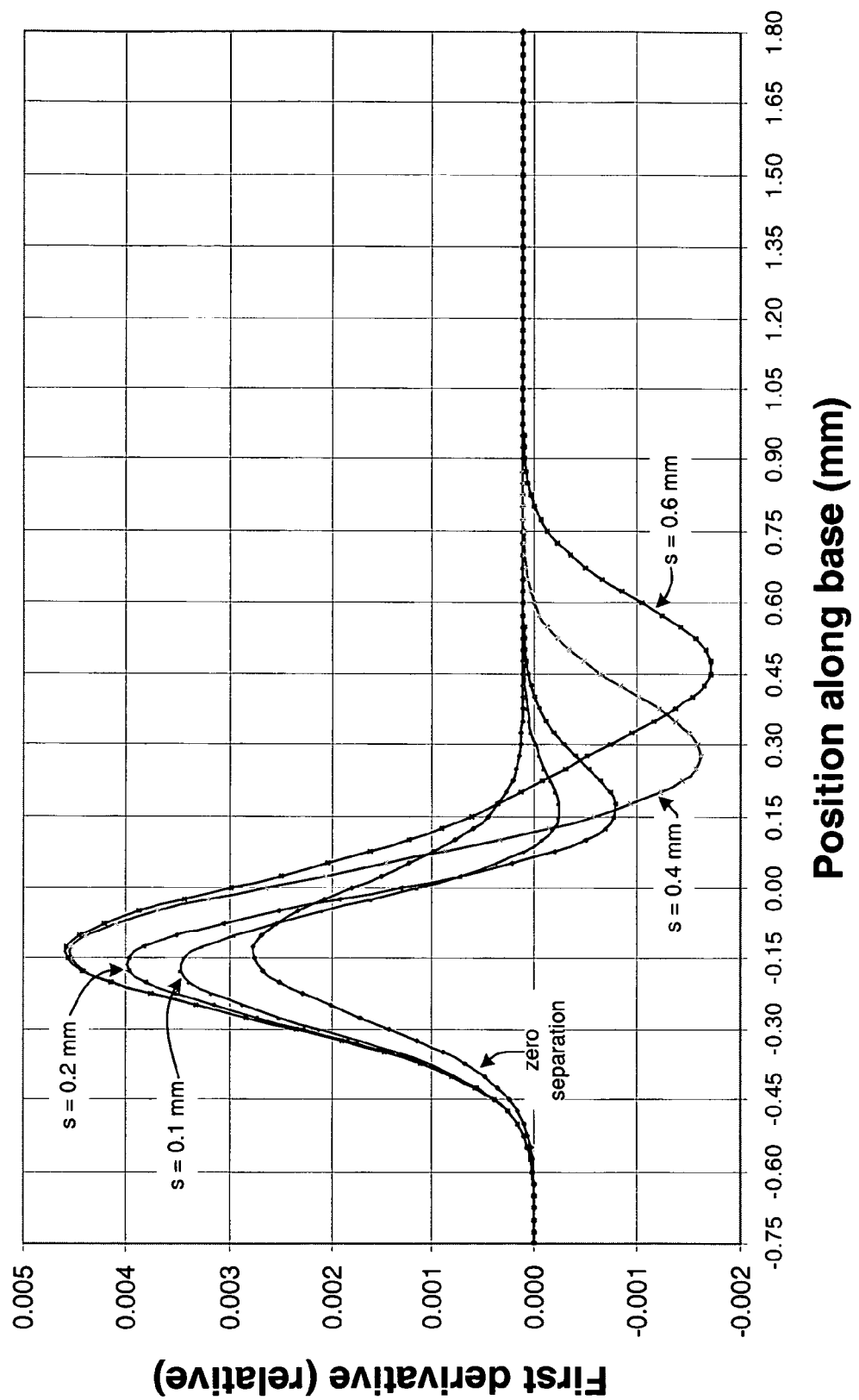
FIG. 10 is a plot of the first derivatives of the profiles of FIG. 8.

In practice, data profiles from actual image data will not be simple integrated Gaussian curves and will be influenced by the fact that the higher transmission region of the profile within the explosive section is a sloped and not constant value. As shown in FIG. 10, however, the first derivative of a data profile is a useful tool for approximating the base location. While the centroid of the curves lays somewhat to the left of the baseline point within the denser portion of the profile, its peak location is still very nearly fixed. There does seem to be a second order effect on the exact location of the centroid, which effect is related to the size of the gap being determined, and the equations that connect this relationship may require a simultaneous set of conditions to give more accurate results. Each of the curves in FIG. 10 is a first derivative of one of the profiles of FIG. 8. As seen in FIG. 10, the maximum of each derivative curve is longitudinally located slightly into the steel-only portion of the shell (i.e., to the left of 0.00 mm). For example, the maximum of the derivative of the zero-separation curve is located at a position −0.12 mm (or approximately −0.8 pixels). For derivatives of profiles for increasing separation values, the maximum moves slightly further into the steel-only region, and then moves back toward the base. For separation values of approximately 0.38 mm to approximately 0.51 mm, the maximum of the first derivative moves approximately −0.23 mm from the base. If an actual profile was obtained for an ideal shell with an unknown separation between 0 and 0.6 mm, the maximum of the first derivative of the profile would locate the base within approximately 0.11 mm of its true location. In other words, after determining a value $x_{max}$ for the first derivative, the true base would be located somewhere between $x_{max}+0.12$ mm and $x_{max}+0.23$ mm. A potential error in base location of 0.11 mm is not acceptable in some applications. However, the error is of the same order of magnitude as the sought-after resolution when measuring explosive-base separation. Accordingly, the maximum of a data profile derivative is useful for finding a first estimate of base location. As described below, the estimate can then be further refined.

Figure 11:
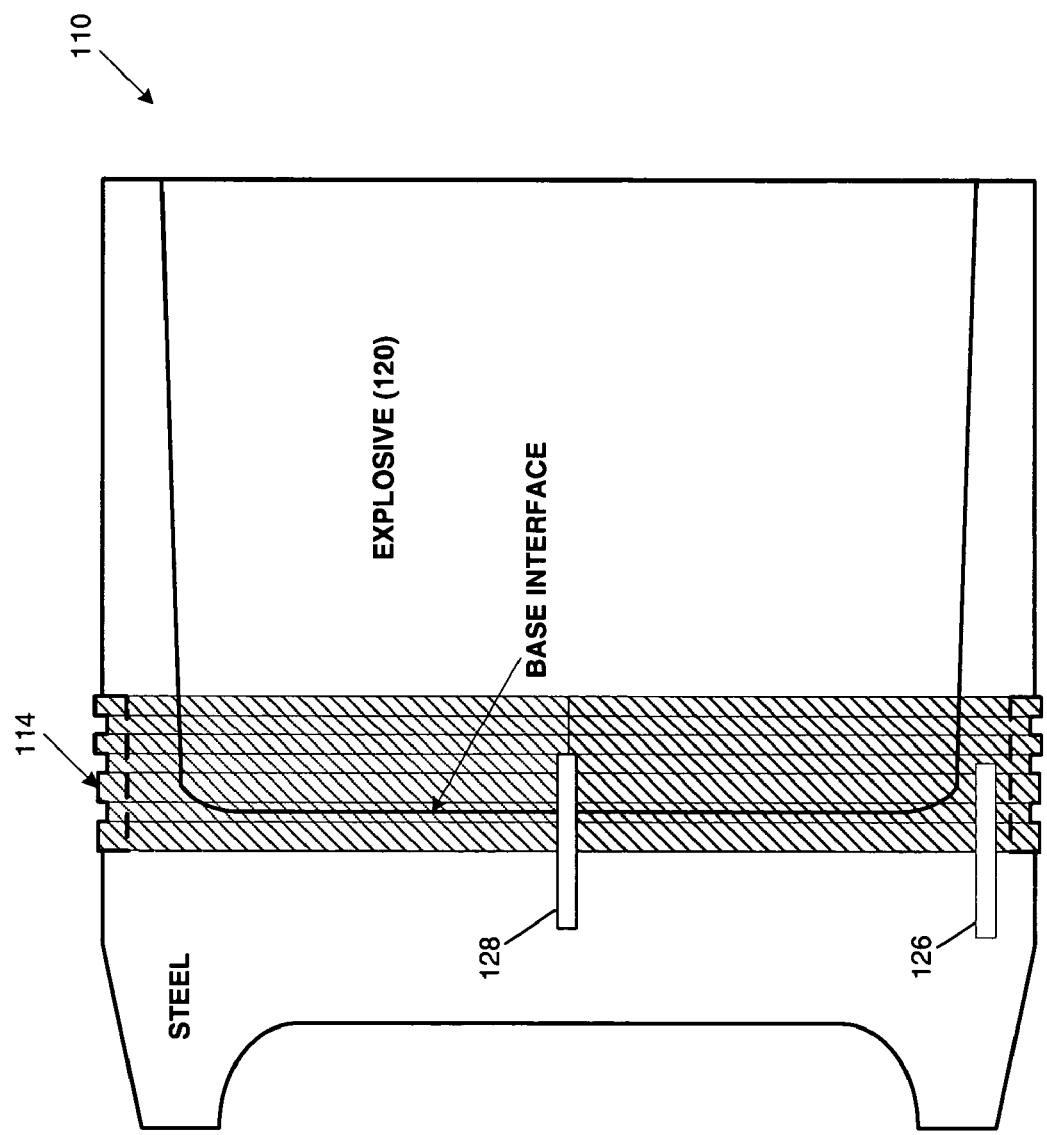
FIG. 11 is another cross section of an artillery shell.
Figure 12:
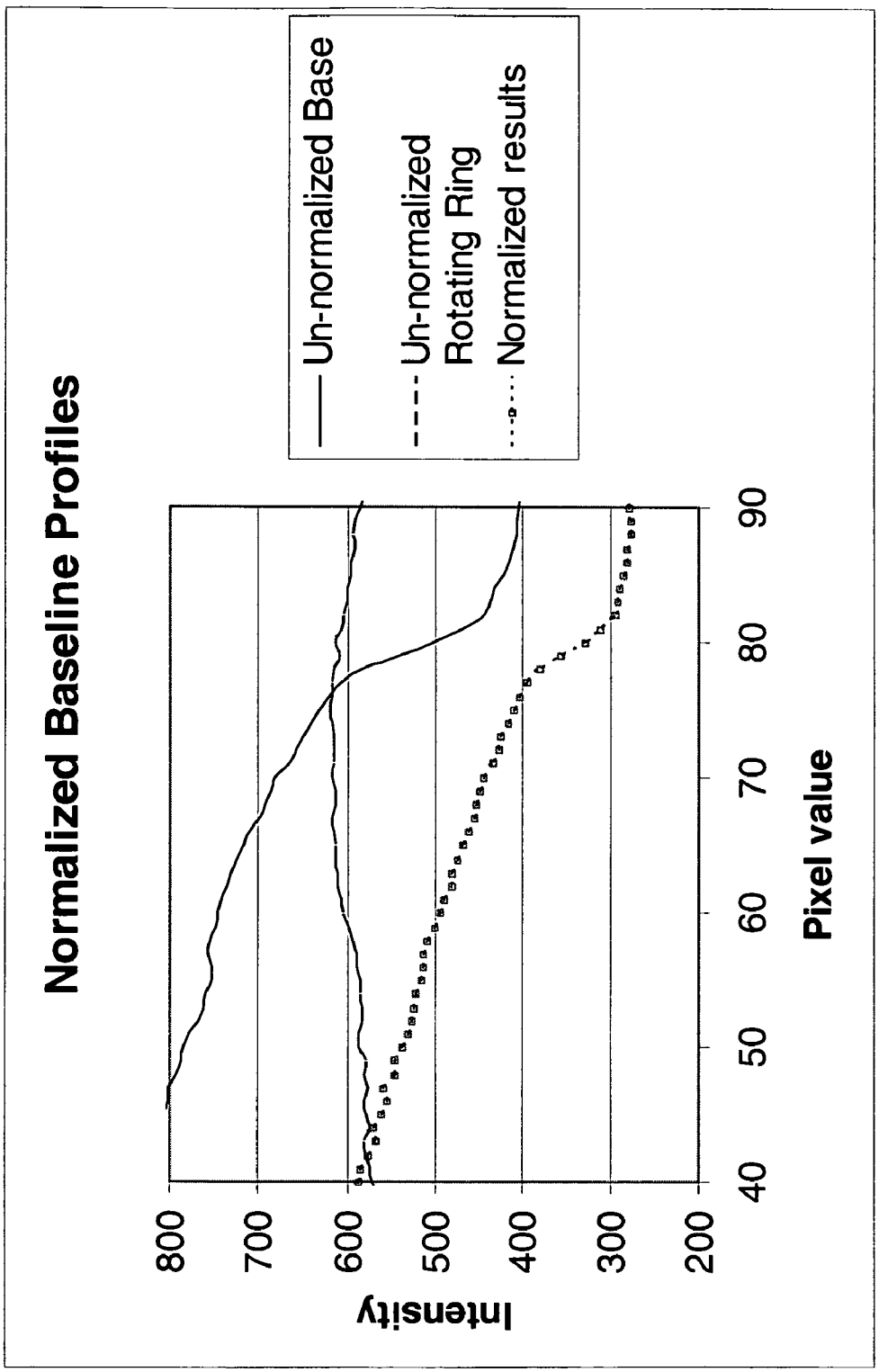
FIG. 12 is a plot illustrating normalization of a data profile.

In the description thus far, the effect of brass rotation band 14 has been ignored in developing a reference profile. In actuality, the grooves in rotation band 14 can have a significant effect (almost 5% in some cases) upon transmission in the region near base 18. Moreover, the locations of the grooves relative to base 18 are uncertain. In order to remove the effect of the grooves from a data profile for an actual shell, profiles are created for two separate regions of the shell. One of the profiles is then normalized by the other. FIG. 11 shows a cross section of an actual shell 110 with the location of rotation band 114 shown with overlaid cross-hatching. For clarity, cross-hatching for the steel cross section and stippling for the explosive cross section are omitted. Two rectangular regions 126 and 128 are shown in FIG. 11. After imaging shell 110, broad horizontal profiles are created for regions 126 and 128. In other words, and as described in more detail below, data for each of regions 126 and 128 is averaged over multiple pixels to reduce statistical noise and reduce the impact of metal imperfections. Region 126 is in a region of shell 110 that does not contain explosive. The attenuation $I/I_0$ in region 126 is proportional to the thickness of the brass and steel. Although the precise thickness may not be known, the steel and brass thicknesses at a given longitudinal location on shell 110 is generally constant over the entire shell circumference. Because of this, the effect of rotation band 114 is generally the same for profiles of regions 126 and 128. By dividing the profile for region 128 by the profile for region 126, the effect of rotation band 114 on the region 128 profile is normalized FIG. 12 is a graph of the above normalization procedure for actual test data. The horizontal pixel numbers profiles of FIG. 12 are reversed in direction from the profiles of FIG. 8, as the experimental data was collected from an image created in a direction opposite to the imaging direction assumed with regard to FIG. 8. "Pixel value" on the horizontal axis of FIG. 12 is an alternate form of measurement along the shell longitudinal axis (e.g., pixel location 60 and pixel location 70 are 10 pixel separation lengths apart). The data profiles of FIG. 12 were generated from image data for an actual shell model calibrated to have a zero explosive-base gap. The normalized profile (which is generated by dividing the original profile by that passing only through the brass ring region) is multiplied by approximately 550 to make it is visible on the same graph. As shown in FIG. 12, the effect of a rotation band groove is significant in the un-normalized profile. However, the effect of the groove is substantially reduced after normalization. Normalizing a profile in this manner has additional advantages. Variations in beam intensity have less effect, and relative band-base alignment is the same for both the un-normalized base and rotation-band-only profiles.

Figure 13A:
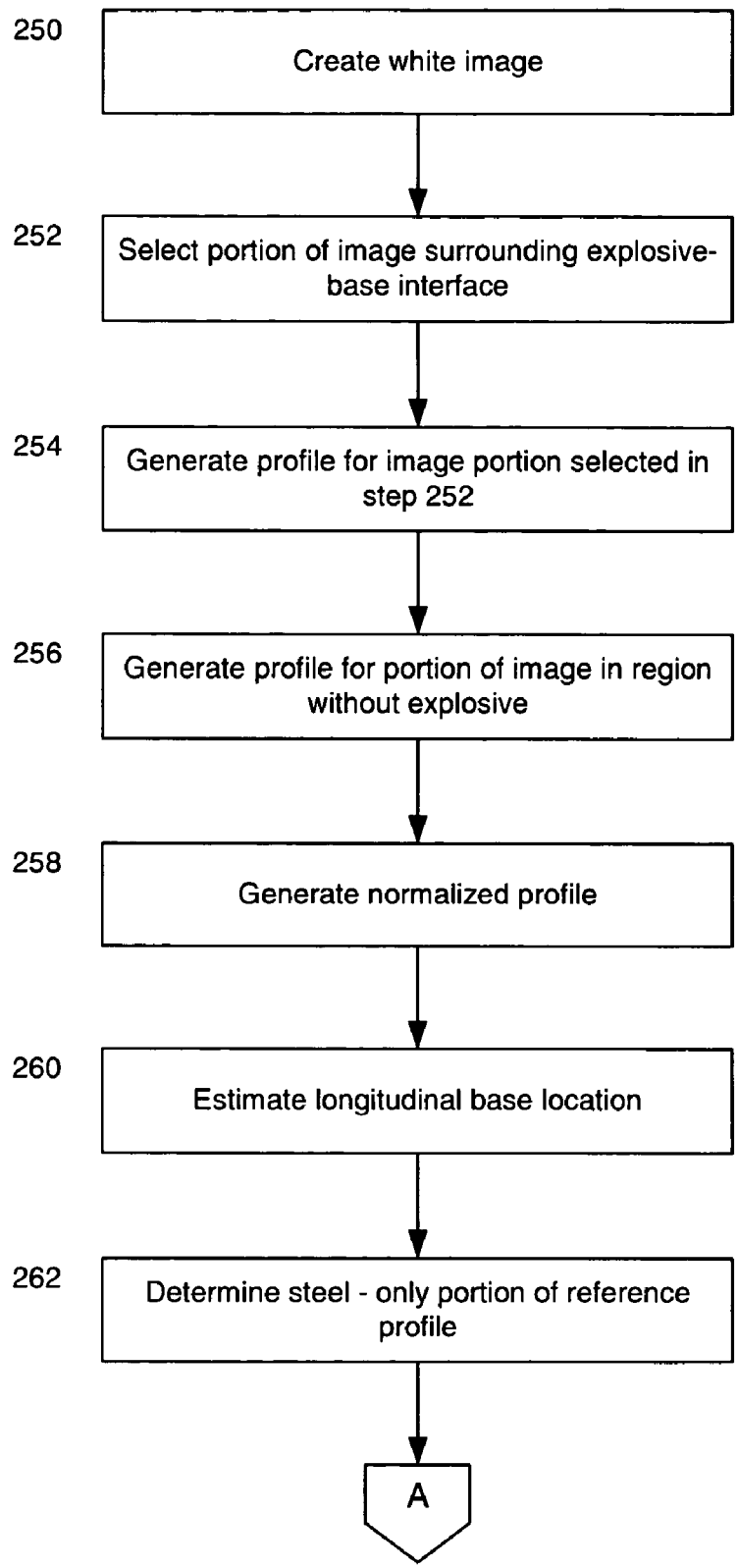
FIGS. 13A and 13B are a flow chart for a method of determining object separation according to at least some embodiments of the invention.
Figure 13B:
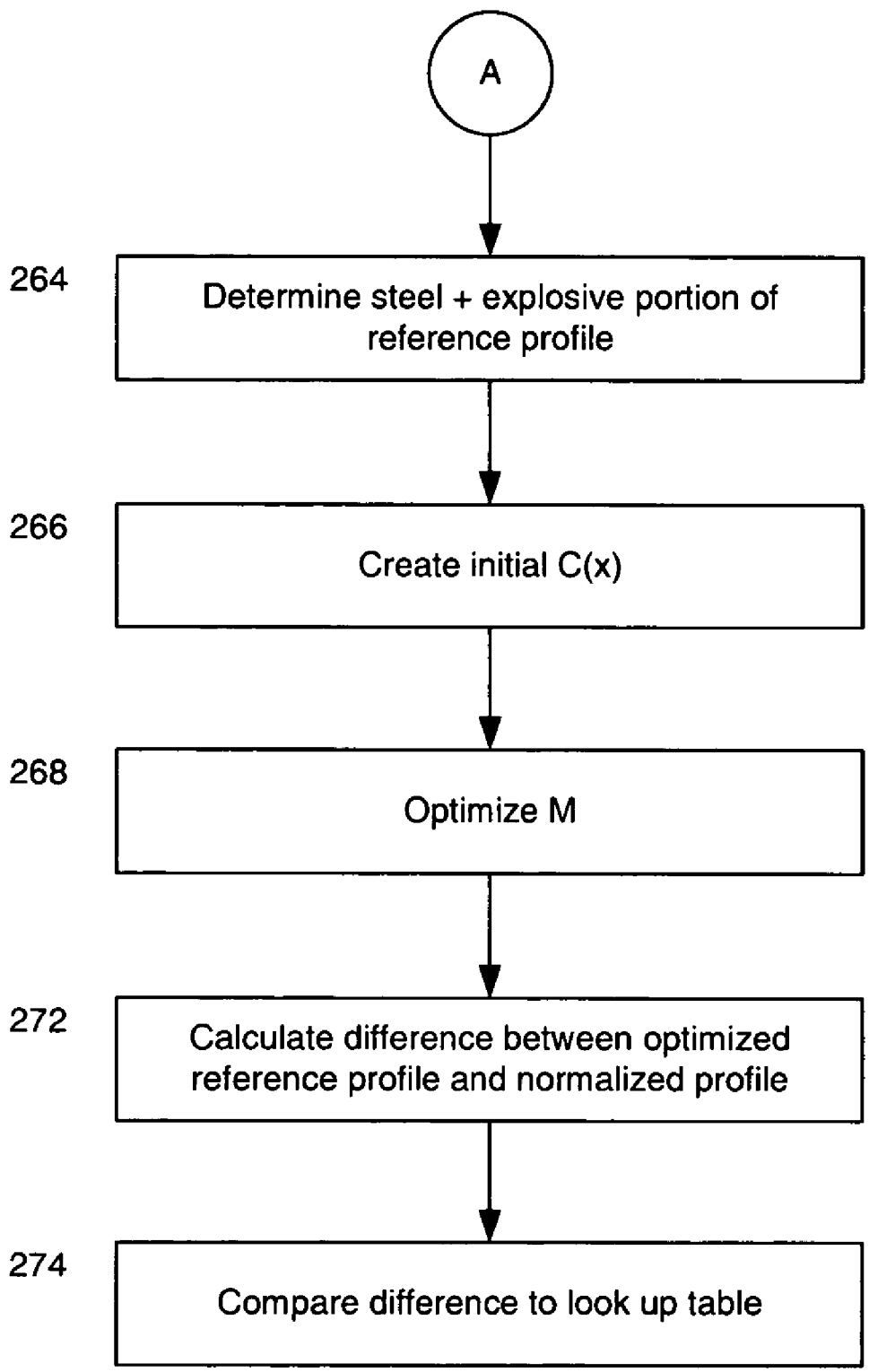

FIGS. 13A and 13B show a flow chart illustrating a method, according to at least some embodiments of the invention, for determining the amount by which the condition of imaged objects varies from a reference condition. In step 250 (FIG. 13A), a white image is first created with the imager. In other words, an image is created without placing a shell or other object in the path of the imaging beam. The image is taken near (but below) saturation and stored in memory for use in removing fixed pattern noise. After imaging a shell (or other object), the resultant image data is normalized by the white image data.

In step 252, a portion of the image corresponding to the approximate base-explosive interface location is selected. As previously indicated, the approximate location of the explosive-base interface can be determined from the image itself. Specifically, a blurred region corresponding to the interface can be found, and a region straddling the blur selected. Alternately, and assuming manufacturing variations among shells are within known tolerances, a region defined by (or based on) those tolerances can be selected. In at least one embodiment, the selected image portion is generally located similar to region 128 (FIG. 11). In one embodiment, the selected image portion is 128 pixels long by N pixels wide. In other words, after finding an approximate location for the explosive-base interface, an N-pixel wide portion of the image starting approximately 64 pixels behind and ending approximately 64 pixels ahead of that approximate location is selected.

In step 254, a profile is generated for data corresponding to the portion selected in step 252. In particular, pixel data used to create the selected image portion is identified. In one embodiment, that data is a 128×N array of pixel data values. Notably, an array having 128 by N pixels is not necessarily used to create the selected image portion. As previously described, a narrow array spanning the width of shell 110 could be moved longitudinally along the shell, with numerous images joined to form a larger image. The identified pixel data could thus include data that was successively generated by the same pixels.

Figure 14:
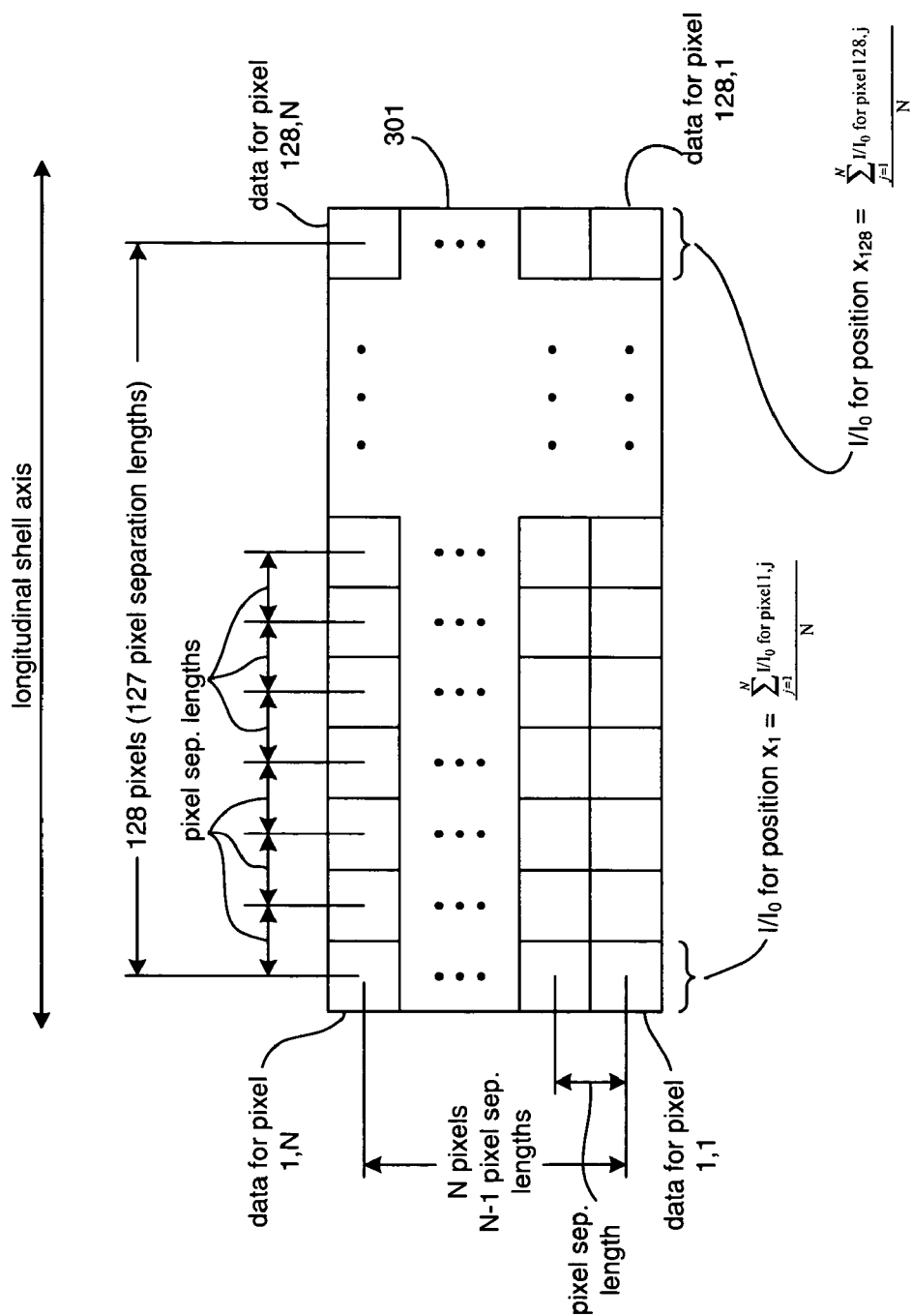
FIG. 14 is a partially schematic drawing of pixel data used in the method of FIGS. 13A-13B.

FIG. 14 schematically shows a pixel data array 301 corresponding to the image portion selected in step 252. Array 301 is indexed into 128 locations along the longitudinal axis of the shell. Each of the longitudinal locations represents a 1-pixel wide part of the selected image portion. Although FIG. 14 schematically shows the pixels as contiguous squares such that pixel width and height equal pixel separation length, this need not be the case. At each longitudinal location in array 301, the outputs of the N pixels across the array at that location are summed, and the sum divided by N. The averaged output at each longitudinal location is then stored to create an initial (un-normalized) profile of 128 pixel data values.

In another embodiment, a profile is generated in step 254 in an alternate manner. In particular, each of the N individual profiles is calculated independently before forming the N pixel wide average. These individual profiles are then each subjected to a spatial derivative and the peak of each profile noted; the individual profiles are then shifted to sub-pixel accuracy forward or backward to align each of the corresponding derivative maxima. In this way, any radial curvature in the metal parts is compensated for by the extended average. This "aligned", broad average improves the statistical accuracy of the data without any significant blurring due to curvature of the base region within the band being measured.

In step 256, a portion of the image outside of the explosive-containing region is selected. If shells are known to be manufactured within certain tolerances, the location of the no-explosive region can be based on those tolerances. Alternatively, a no-explosive region can be identified from the image. The selected no-explosive image portion is the same size as the portion selected in step 252 and is located at the same position along the longitudinal shell axis. In at least one embodiment, the image portion selected in step 256 is generally located similar to region 126 (FIG. 11). A data profile is then generated for the selected no-explosive image portion. In at least one embodiment, the no-explosive image portion is also 128 pixels long by N pixels wide, and the data profile is generated in a manner similar to that described in connection with FIG. 14. In alternate embodiments, an aligned, broad average can also be used for calculating the profile in step 256.

In step 258, the profile from step 254 is divided by the profile from step 256 to obtain a normalized profile. In at least one embodiment, the normalized profile is obtained by dividing each averaged $I/I_0$ value from step 254 with the averaged $I/I_0$ value from step 256 at the same longitudinal pixel location. The normalized profile is then stored as a 128×1 data array. If the aligned, broad average is used in 254, then each of the N profiles may be normalized first from the profile of step 256 and then the wide average of the normalized result calculated. This allows each of the 1 pixel wide profiles to be individually normalized before combining the data to insure that any curvature in the base region is fully compensated for.

In step 260, a first estimate for the longitudinal base location is obtained. In at least one embodiment, the derivative of the normalized profile (from step 258) is obtained numerically. Specifically, for each longitudinal pixel location along the normalized profile, the numerical derivative is calculated according to Equation (3).

$$\mathrm{DERIV}(x) = \frac{[VI_0|_{norm}(x+1) - VI_0|_{norm}(x-1)]}{2} \quad \text{Equation (3)}$$

In Equation (3), x is the longitudinal location for which the derivative DERIV(x) is calculated. $I/I_0|_{norm}(x)$ is the normalized value for the N-pixel averaged attenuation at longitudinal location x (i.e., the value from the normalized profile of step 258 for that longitudinal location). In at least some embodiments, a value for DERIV( ) is not calculated for the first and last longitudinal location since that would involve having the next points in the profile which were not recorded. After calculating the values for DERIV(x) for the normalized profile, a maximum is found, and the longitudinal location $x_{max}$ corresponding to the maximum identified. As first approximation, the base is assumed to be located 0.8 pixel separation distances from location $x_{max}$ in the direction of the explosive. This initial approximation is derived from the analysis of the theoretically generated Gaussian shapes and a general knowledge of the material shapes.

In step 262, the steel-only portion of a reference data profile is determined. After identifying a first approximation for base location in the normalized profile, a line is fit to the normalized profile data (from step 258) beginning approximately 5 pixel separation distances away from the first base approximation. The equation for this line is called $L_s(x)$. In step 264 (FIG. 13B), the steel+explosive portion of the reference data profile is determined. This portion, line $L_{S+E}(x)$, is fit to the portion of the normalized data profile beginning approximately 8 pixel separation distances (into the explosive region) away from the first base approximation. In some embodiments, $L_{S+E}(x)$ is fit to the portion of the normalized data profile beginning approximately 8 pixel separation lengths into the explosive region and extending for about 15 to 20 pixel separation lengths.

In step 266, a function describing the reference data profile for a zero-separation condition is initially created. In particular, that function is initially defined by Equation (4).

$$C(x) = L_s(x) + H\left[1 - \sum_{M-5}^{x_{end}} P(x, M, \sigma)\right] \quad \text{Equation (4)}$$

where: $P(x,M,\sigma)$ is the point spread function for the imager with a mean M centered on the base location and a standard deviation $\sigma$, M−5 is the longitudinal location 5 pixel separation lengths into the steel-only portion from the longitudinal location corresponding to the mean M, x is a longitudinal location along the shell axis, $x_{end}$ is the last longitudinal location for which $L_{S+E}$ was determined, and H is a constant representing the height of the integral of $P(x,M,\sigma)$.

The standard deviation $\sigma$ in Equation (4) is 1.9 pixel separation lengths in some embodiments, but this value will vary for different imaging systems. The standard deviation $\sigma$ may also be modified based on test data. The height H in Equation 4 is initially approximated to be 0.25, although other values can also be used. This value is obtained by experimentally fitting curves taken both on the model and using real data for the particular samples being studied. The linear curve, $L_{S+E}(x)$, is extrapolated beyond the original data set used to calculate it, back toward the interface region and matched with the integrated point spread function at the point located at M+5 pixels, as is suggested in FIG. 8. Notably, C(x) can be evaluated using values of x that correspond to fractional pixel separation lengths.

As previously discussed, the first approximation for base location derived from the maximum of a data profile derivative is not sufficiently accurate for certain applications. As seen by reference to the calculated zero-separation profile for an ideal shell (FIG. 8), the integrated Gaussian best fits between the steel and the steel+explosive lines if the base location intersects the integrated Gaussian at a point approximately 25% to 30% below the maximum height of the integrated Gaussian. This roughly corresponds to approximately +1σ. In order to better approximate base location (and thus optimize the value of M in the reference profile function), the initial reference profile function (Equation (4), step 266) is fit to the normalized profile (from step 258) at step 268. In at least one embodiment, the value of M in Equation (4) is successively varied. For each value of M, the difference between the reference profile function (with a new value for M) and the normalized profile of step 258 (using the first estimate of M) is calculated. Using a Chi squared procedure, the value of M is further refined.

Figure 15:
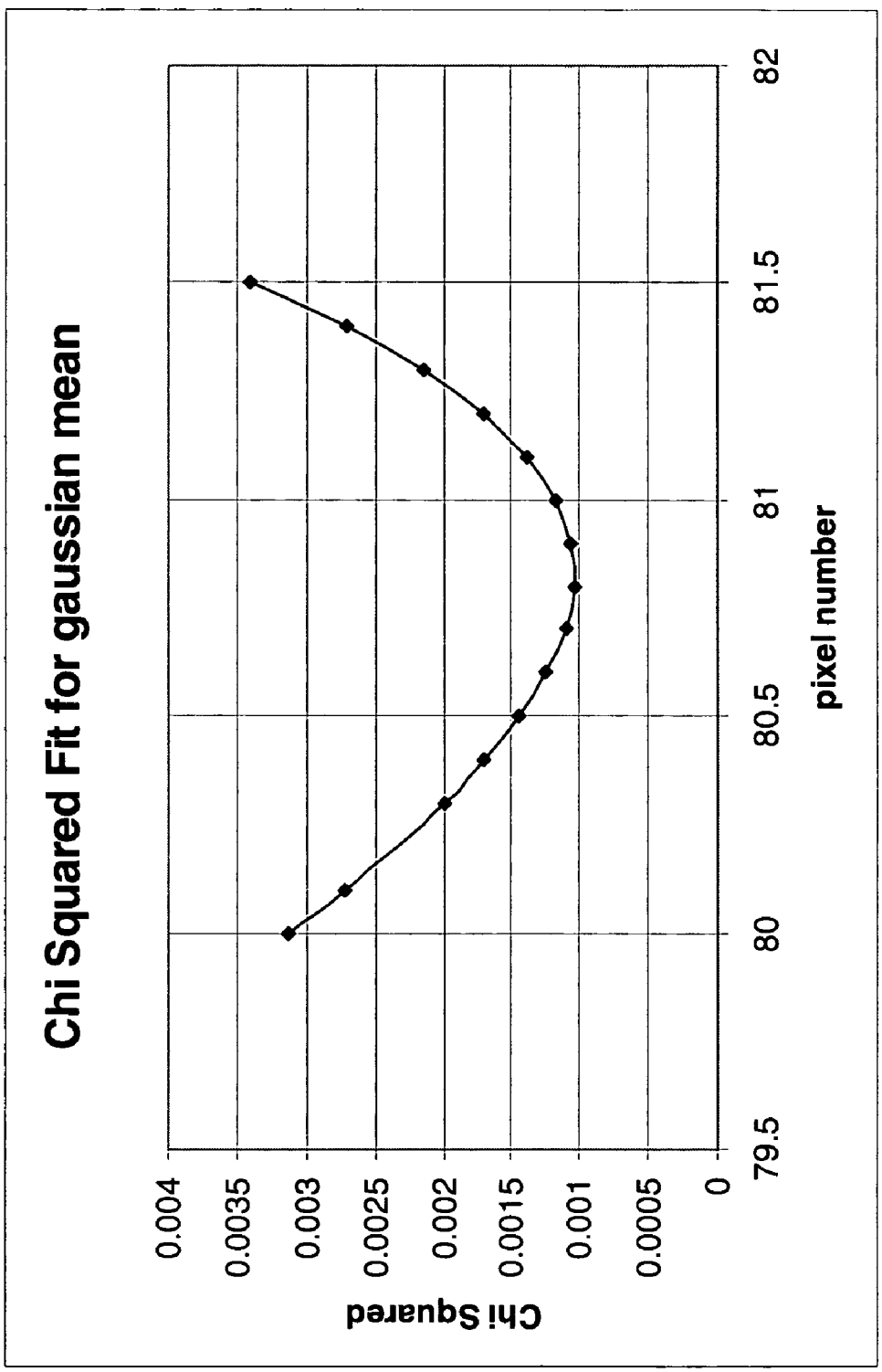
FIG. 15 is a graph showing optimization of a value in a reference profile function.

In particular, M in Equation (4) is assigned an initial starting value ($M_1$) of one standard deviation into the steel only region from the first approximation of base location calculated in step 260. At a discrete number of points along the length of the shell (e.g., $x=M_1-5$ pixel separation lengths, $x=M_1-4$ pixel separation lengths, ... $x=M_1+5$ pixel separation lengths), the value of $C(x,M_1)$ is calculated. For each value of $C(x,M_1)$, a value is found from the normalized profile (of step 258) that corresponds to the same longitudinal location along shell 110; in some cases, this may require interpolation between normalized profile values. The difference between each $C(x,M_1)$ value and its corresponding normalized profile value is squared, and the squares summed. This value is repeated for successive values of M (e.g., $M_2=M_1+0.1$ pixel separation lengths, $M_3=M_1+0.2$ pixel separation lengths, etc.). The value of M yielding the lowest sum of the squares is chosen as the optimized value ($M_{opt}$). FIG. 15 is a graph showing one example of Chi squared values for various values of M.

In step 272, the difference between the profile from step 268 and the normalized profile from step 258 is calculated. This difference can be calculated in various ways, so long as it is calculated in a consistent manner. In at least one embodiment, this difference is calculated using a Chi squared procedure similar to that of step 268. In other embodiments, the difference is calculated using RMS (root mean squared) values of differences between values for the optimized reference profile and the normalized profile at discrete longitudinal locations.

In step 274, the difference from step 272 is compared to a lookup table (not shown) to determine the explosive-base separation. In at least one embodiment, this lookup table is generated by creating multiple images of a calibrated shell at various known values for explosive-base separation. For each value of explosive-base separation, the difference between a zero-separation data profile and a normalized image data profile is determined. This difference can be determined in numerous ways, but is determined in the same manner used in step 272. These differences are then used to populate a lookup table mapping values for difference with values for separation.

Figure 16:
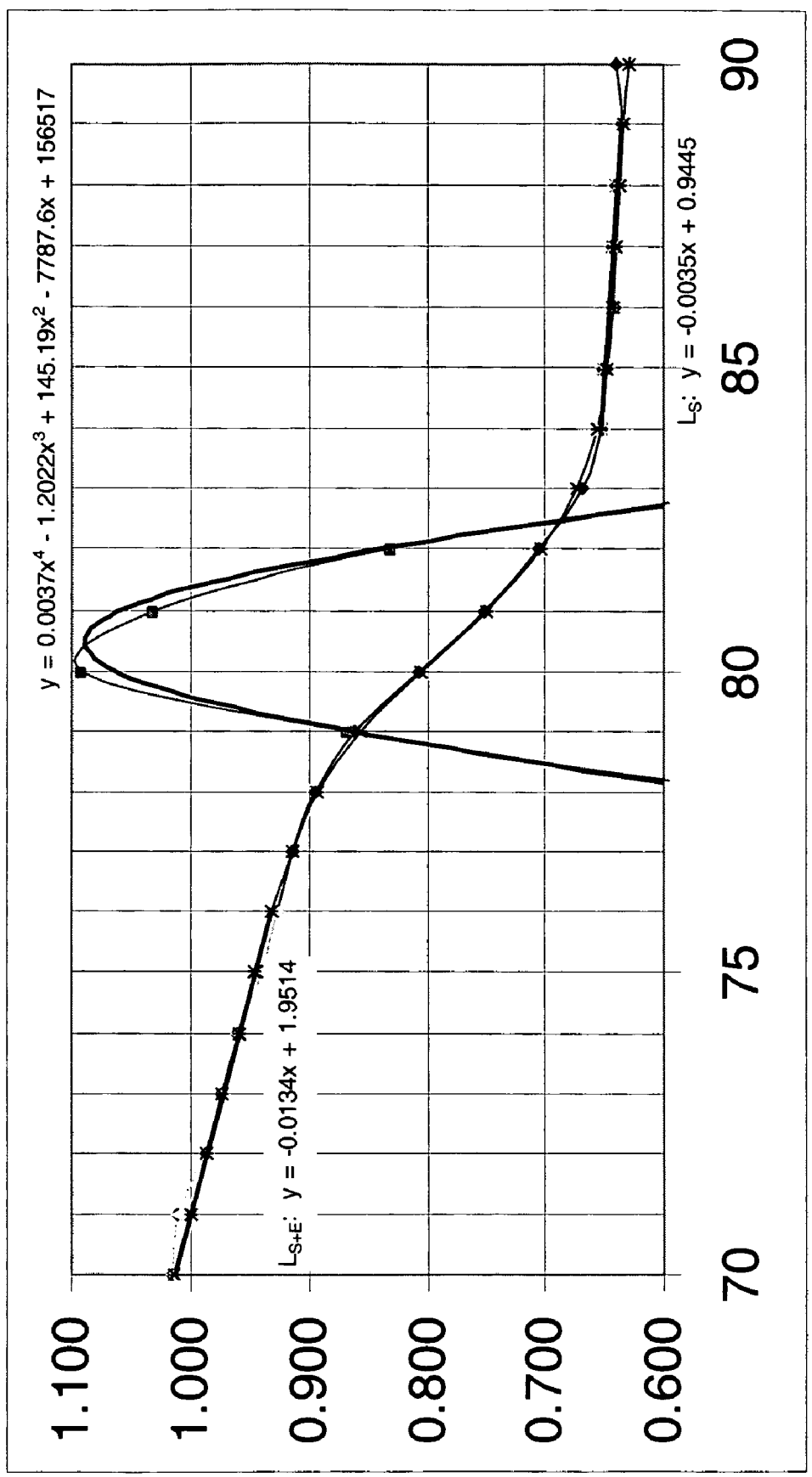
FIG. 16 is a plot showing an example of a reference profile created using the procedure of FIGS. 13A-13B.
Figure 17A:
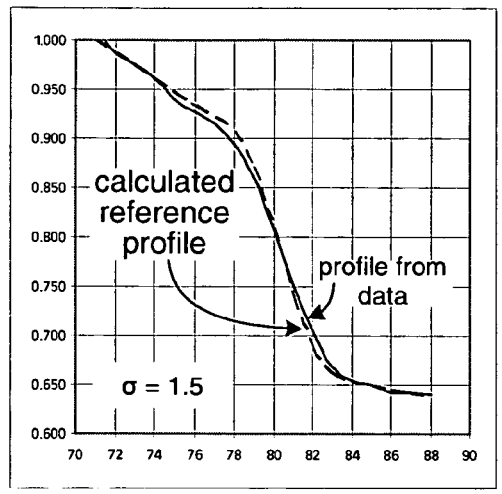
FIGS. 17A-17C illustrate the effect of changing the standard deviation in a reference profile function from 1.5 to 2.3 pixel separation lengths.
Figure 17B:
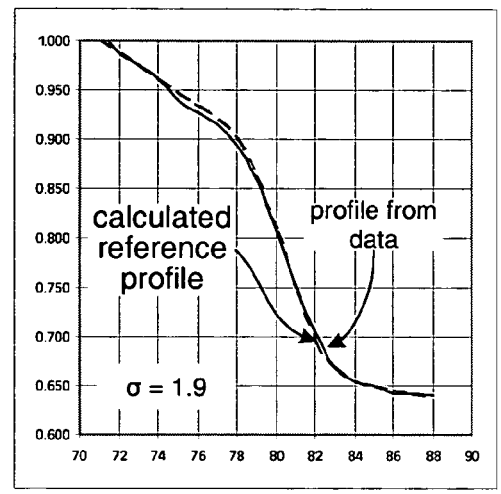
Figure 17C:
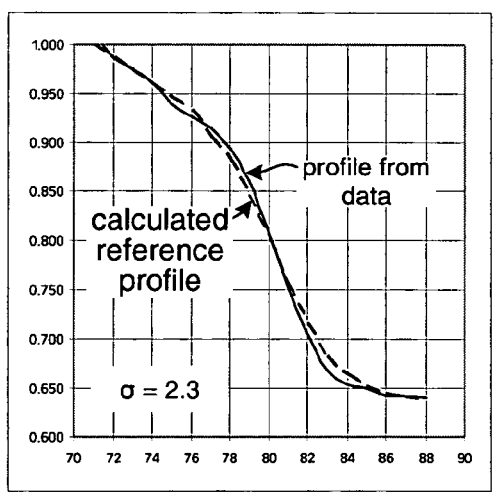
Figure 18A:
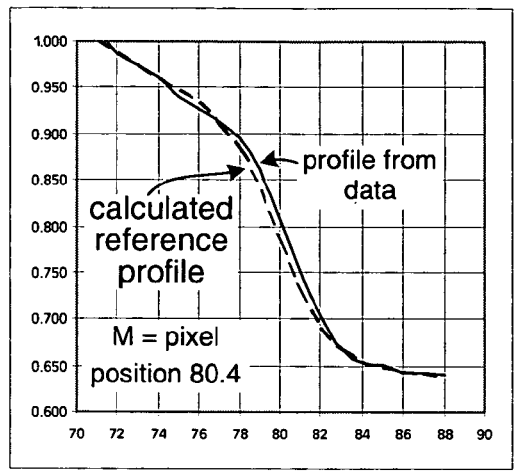
FIGS. 18A-18C illustrate the effect of optimizing the mean in a reference profile function.
Figure 18B:
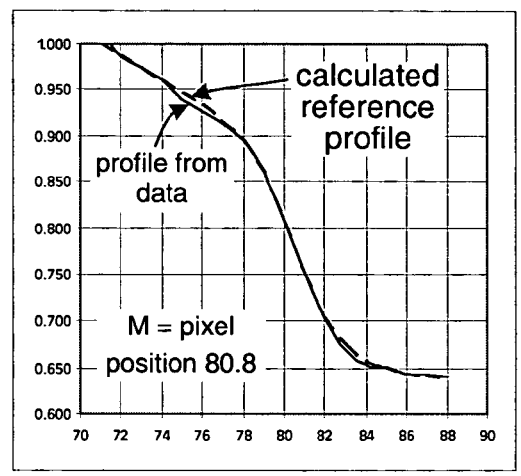
Figure 18C:
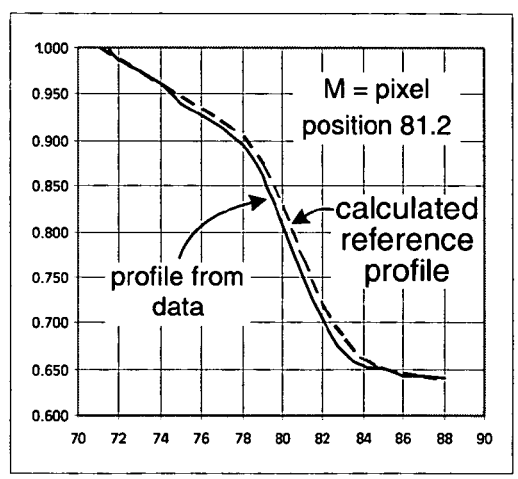

FIG. 16 is a plot showing one example of a reference profile created from actual image data using the procedure described in FIGS. 13A-13B. The profile is oriented in an opposite direction to the profiles of FIG. 8, as the image data was collected in a direction opposite from that assumed in connection with FIG. 8. The derivative is amplified and truncated so that it shows on the same scale as the profile. FIG. 16 assumes a value for σ of 1.9 pixel separation lengths. A polynomial was used for calculational convenience to approximate the experimental shape for the purpose of obtaining an analytic approximation to the actual curve. In the case used in FIG. 16, a $4^{th}$ order polynomial gave a very close fit and could be used to approximate the data but is not ultimately required for the method to function. FIGS. 17A-17C illustrate the effect of changing σ to 1.5 and 2.3 pixel separation lengths. FIGS. 18A-18C illustrate the effect of optimizing M.

Figure 19:
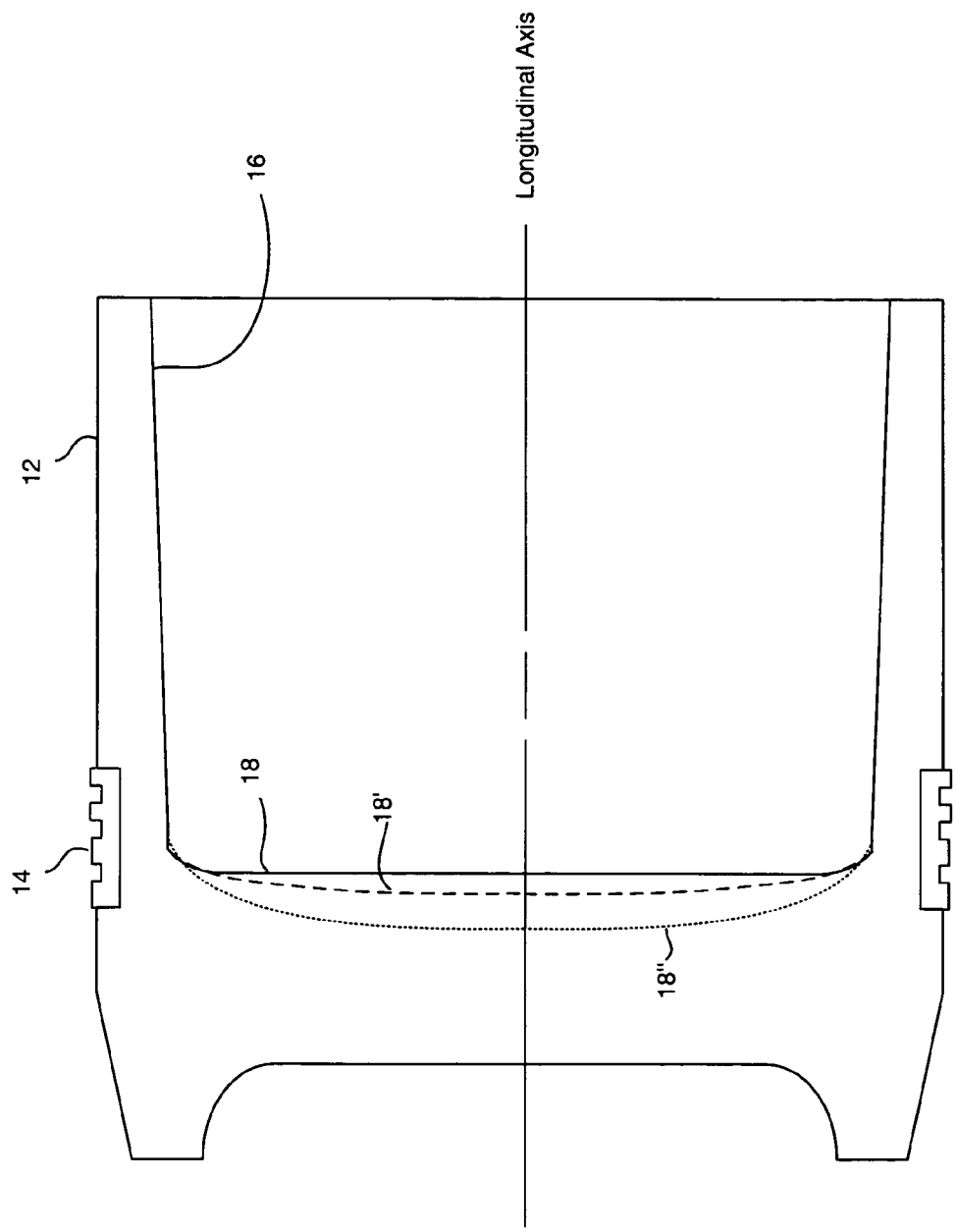
FIG. 19 is a cross section of an artillery shell similar to that of FIG. 2, but showing variation in base curvature.

The method described above works well if the shape of the explosive-base interface remains generally constant. In practice, however, the forging process used to create steel shell casings yields cavity bases of varying shape. Some bases are flatter, while others tend to be more curved. This is illustrated in FIG. 19. This introduces a new variable into the measurement of explosive-base separation. If the difference from step 272 of FIG. 13B is not compared against a lookup table derived from a shell (or shells) having the same base shape, the reliability of the procedure is undermined.

As seen in FIG. 10 the first derivative of the profile varies with changing values of explosive-base separation. Specifically, larger explosive-base separations result in larger peak derivative values. The shape of the derivative has also been found to be dependent upon the overall shape of the shell base, e.g., the degree to which the base is curved or flat. However, based on tests conducted upon three test shells having varying base shapes, a correlation between base shape and explosive-base separation has been found. Specifically, three samples having varying base shapes were fabricated. Each sample was then fit with a molded explosive simulant conforming directly to the base, and which could be separated from the base by a known distance. For each sample shell, several images were taken at separations of 0.005, 0.010, 0.015, 0.020 and 0.025 inches (approximately 0.13, 0.25, 0.38, 0.51 and 0.64 mm). Specifically, at each separation value, images were taken from several radial orientations relative to the shell longitudinal axis.

Figure 20:
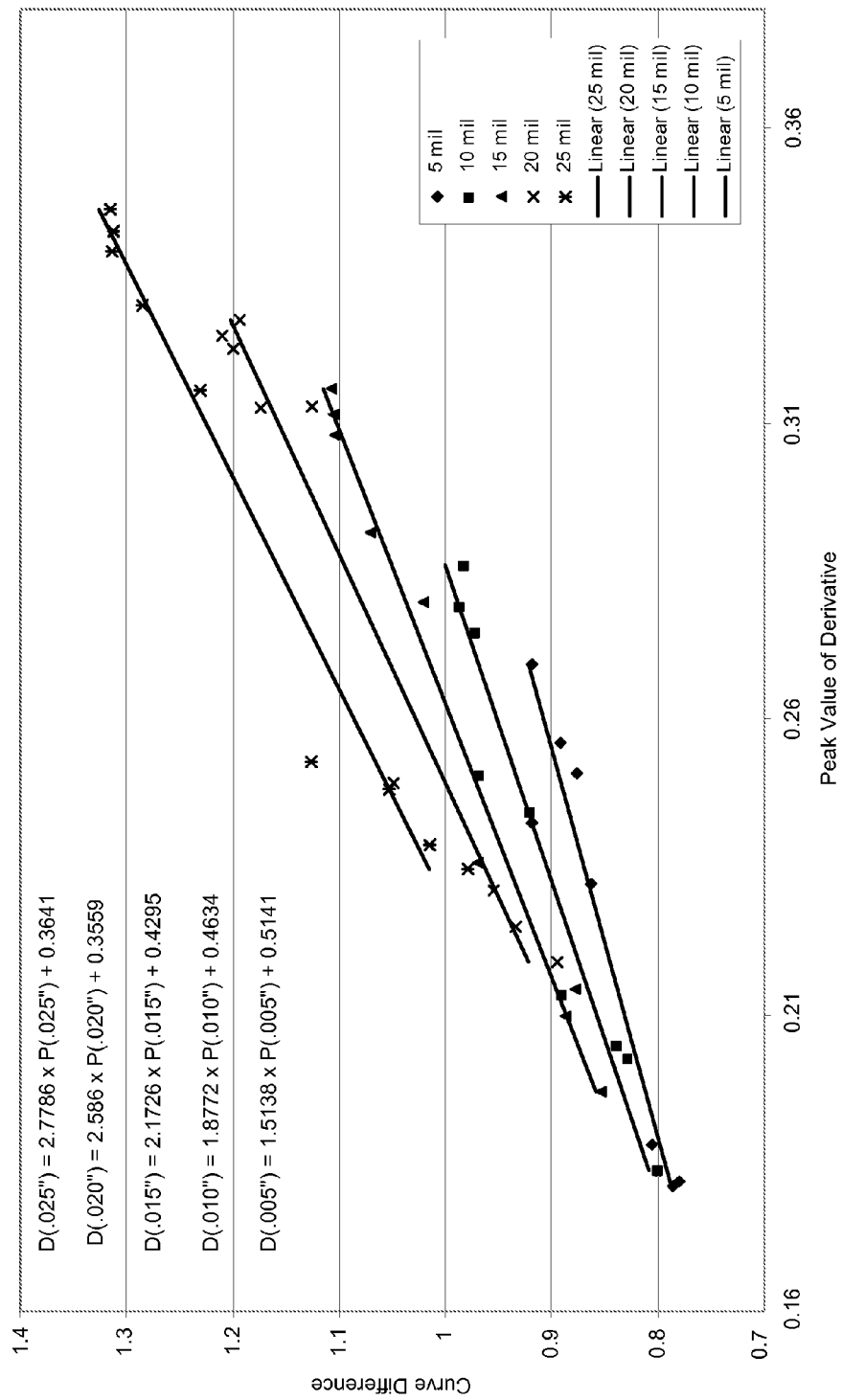
FIG. 20 is a plot of profile difference vs. peak derivative value for test samples, each having differently shaped bases.

For each image, a normalized profile was obtained (using the procedure of steps 250-258 of FIG. 13A) for a region straddling the explosive-base interface. A zero-separation reference profile function for that image region was then generated using the procedure of steps 260-272 of FIGS. 13A-13B. The difference between the normalized and a reference profile was then calculated using a root mean square difference and plotted against the peak value of the derivative of the normalized profile. The data for each value of separation was then fit with a straight line. FIG. 20 shows the results taken from several shells.

Figure 21:
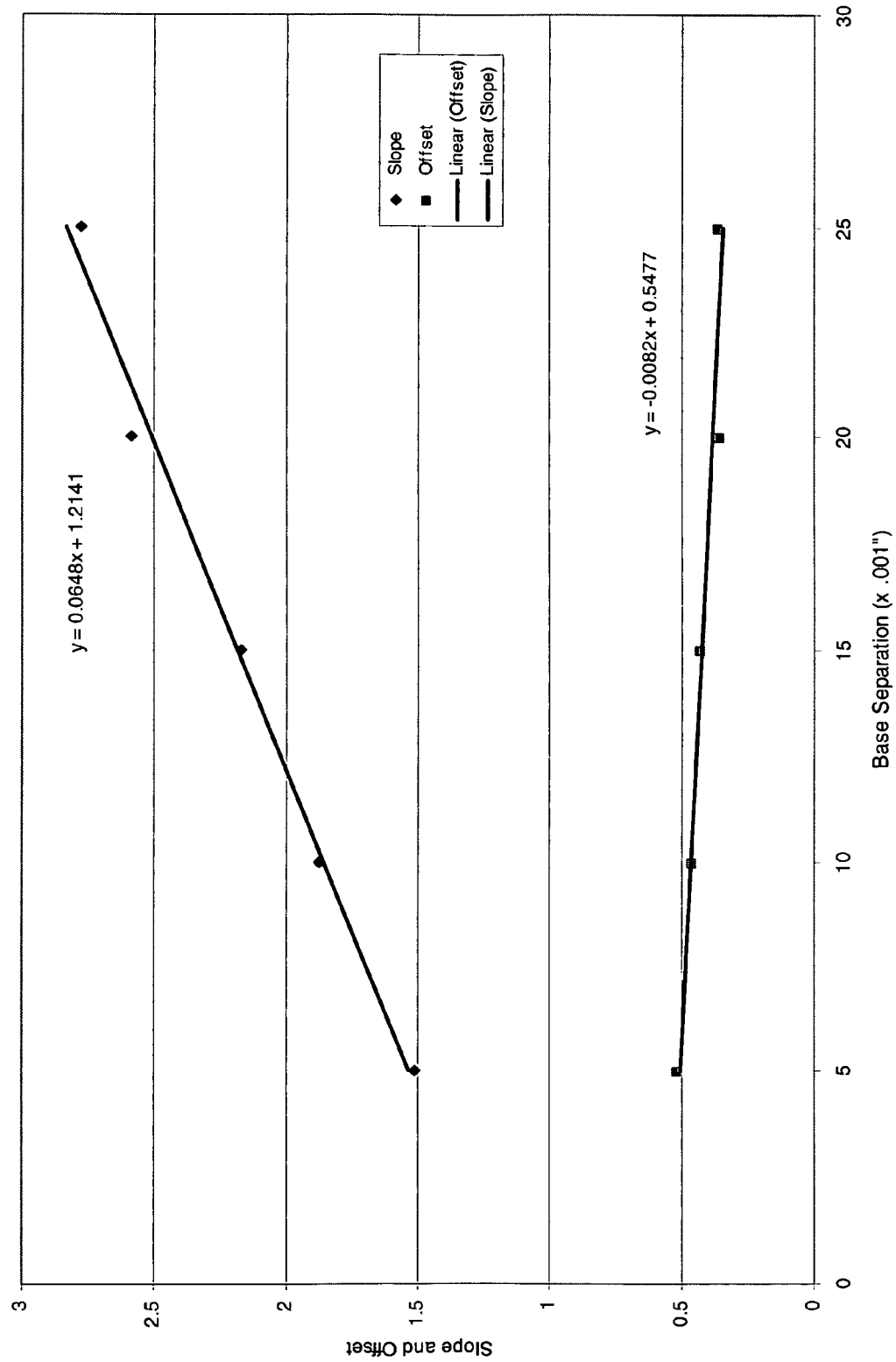
FIG. 21 shows the relation of slope and offset to separation distance for the lines in FIG. 20.

As seen in FIG. 20, the lines vary by slope and offset as a function of explosive-base separation. As FIG. 20 shows, the actual separation between the explosive and steel changes the relationship when comparing the actual and reference profiles; the overall fall-off rate from the steel to the steel+explosive reference curve varies from sample to sample. In other words, measurements on each of the three samples at various angles fall along the same straight line relationship for any given separation value, but the line changes as separation changes. Put differently, the quantity being measured (explosive-base separation) affects the measurement algorithm. In order to develop a relationship between the two measurements and the actual separations, the curves can be approximated by straight lines and the relationship solved for analytically. In FIG. 21, offset for the lines of FIG. 20 is plotted against base separation. Similarly, slope for the lines of FIG. 20 is plotted against base separation. From FIG. 21, relationships for slope vs. separation and offset vs. separation can be obtained. Specifically, $A(x)=\text{slope}=a_1 x + a_0$ and $B(x)=\text{offset}=b_1 x + b_0$. For the data shown in FIG. 20, and using mils (0.001") as the units of separation measurement, $A(x)=0.0648x+1.2141$ and $B(x)=-0.0082x+0.5477$ (after converting to inches instead of mils, $A(x)=64.8x+0.001214$ inches, and $B(x)=-8.2x+0.000548$ inches). This leads to Equation (5), which relates deviation between actual and reference profiles to derivative of the actual profile.

$$\Delta(x)=A(x)*R'(x)_{MAX}+B(x), \quad \text{Equation (5)}$$

where: $\Delta(x)$ is the difference between the normalized profile and a zero-separation reference profile generated from the normalized profile, $R'(X)_{MAX}$ is the peak value of the derivative of the normalized profile, x is the explosive-base separation, $A(x)$ is a linear function of the form $a_1x+a_0$, and $B(x)$ is a linear function of the form $b_1x+b_0$.

Equation (5) can be re-expressed as Equation (6).

$$\Delta(x)=[a_1x+a_0]*R'(x)_{MAX}+[b_1x+b_0] \quad \text{Equation (6)}$$

Solving for x, the separation, Equation (6) becomes Equation (7).

$$x=[\Delta(x)-a_0*R'(x)_{MAX}-b_0]/[a_1*R'(x)_{MAX}+b_1] \quad \text{Equation (7)}$$

Figure 22:
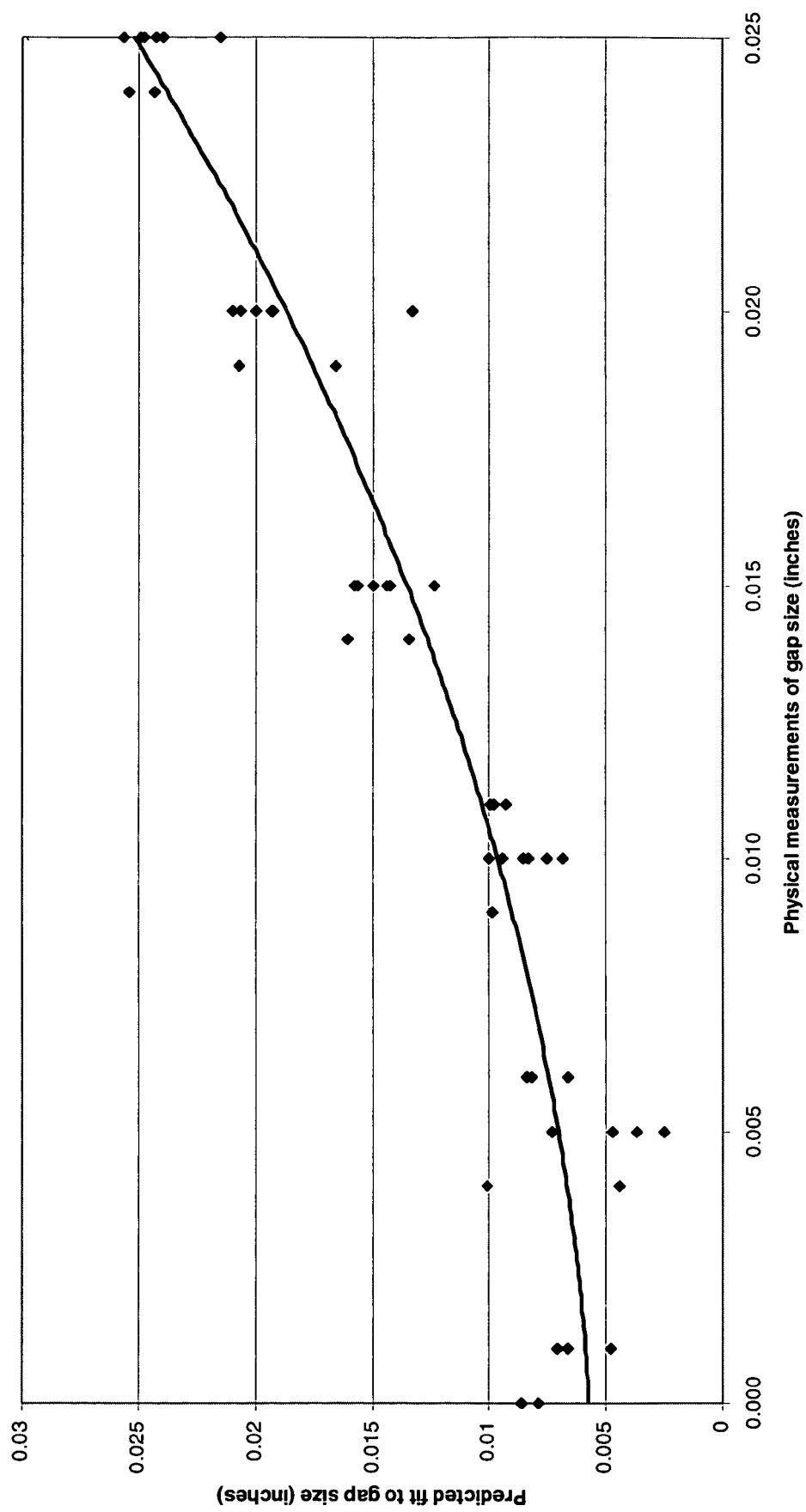
FIG. 22 shows the experimental correlation between actual physically measured separation distance and algorithmically predicted separation distance.

FIG. 22 shows the correlation, using a second order polynomial fit, between actual separation distance and separation distance predicted by Equation (7). Standard deviation ($\sigma$) tends to be below approximately 0.003" for values in excess of 0.005".

Although based on a limited number of test measurements, a trend is well demonstrated. In particular, FIG. 22 shows that the use of a correlated measurement of both the deviation (i.e., normalized and reference profile difference) within a narrow band close to the separation point and the overall shape of the steel-to-explosive transition can remove ambiguities that exist if only the deviation is used.

Figure 23A:
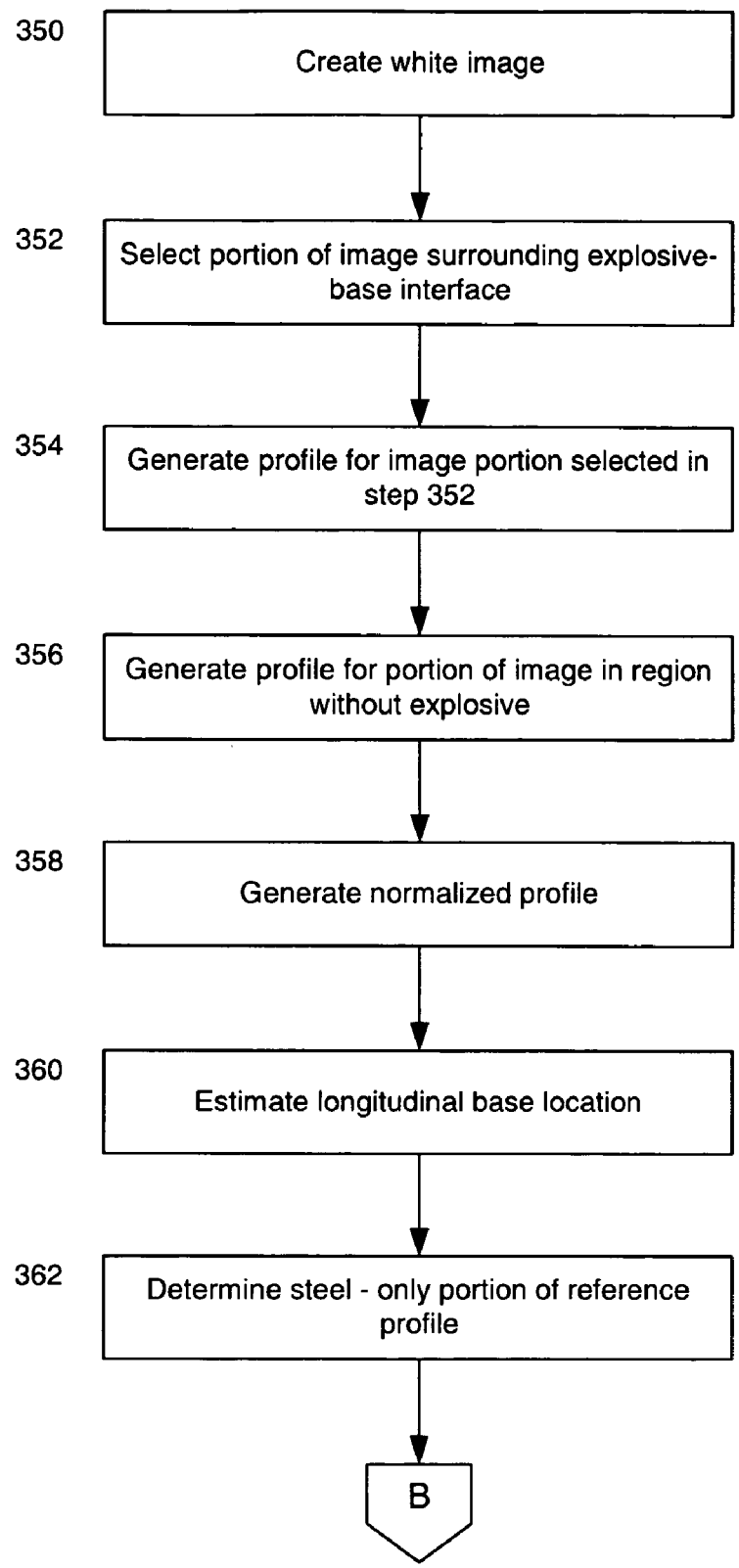
FIGS. 23A and 23B are a flow chart for a method of determining object separation according to at least an additional embodiment of the invention.
Figure 23B:
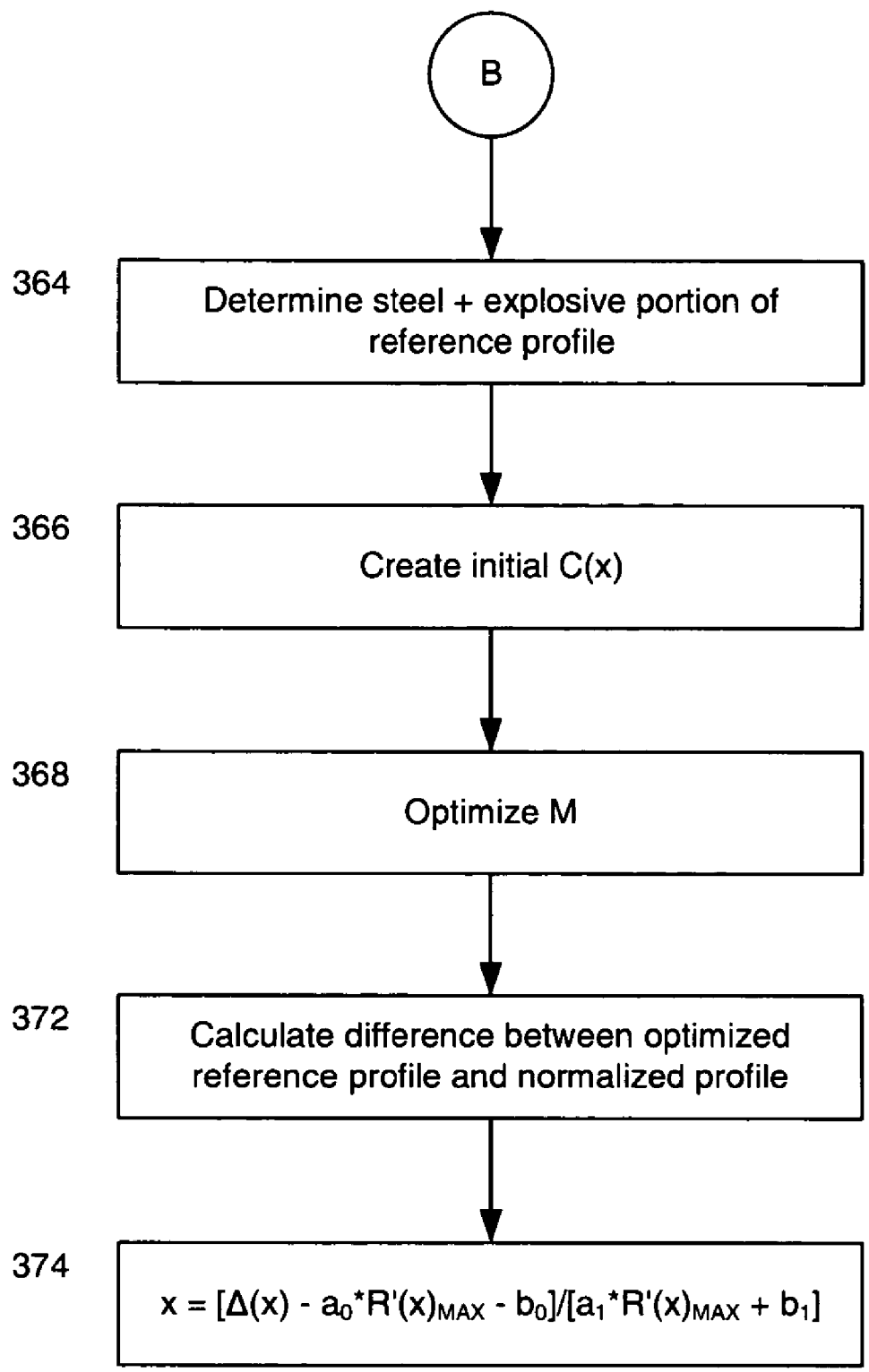

FIGS. 23A and 23B show a flow chart illustrating a method, according to at least some embodiments of the invention, incorporating the above discussion of FIGS. 20-22 and Equations (5) through (7). Steps 350 through 368 are generally similar to steps 250 through 268 in FIGS. 13A-13B. At step 372 (FIG. 23B), $R'(x)_{MAX}$ for the normalized data profile (step 358) is calculated, as is $\Delta(x)$ for the normalized data profile and the calculated reference profile. These values are then inserted into Equation (7), and the separation x calculated (step 374). The constants $a_0$, $a_1$, $b_0$ and $b_1$ for equation (7) are experimentally derived from images of test samples having known characteristics (dimension(s), shape, separation, etc.).

Additional improvements in measurement precision can also be obtained through improvement of various parameters of an imaging system. These parameters include finite x-ray focal dimensions and geometric magnification, spatial blur induced by thick conversion screen and beam parallax, depth of field limitations induced by use of a fast lens, and limited pixel pitch in a CCD (charge coupled device) pixel array. For example, reducing magnification on an imaging array with a source unsharpness of 0.006 inches (at shell center) can reduce such unsharpness by approximately one half.

Figure 24:
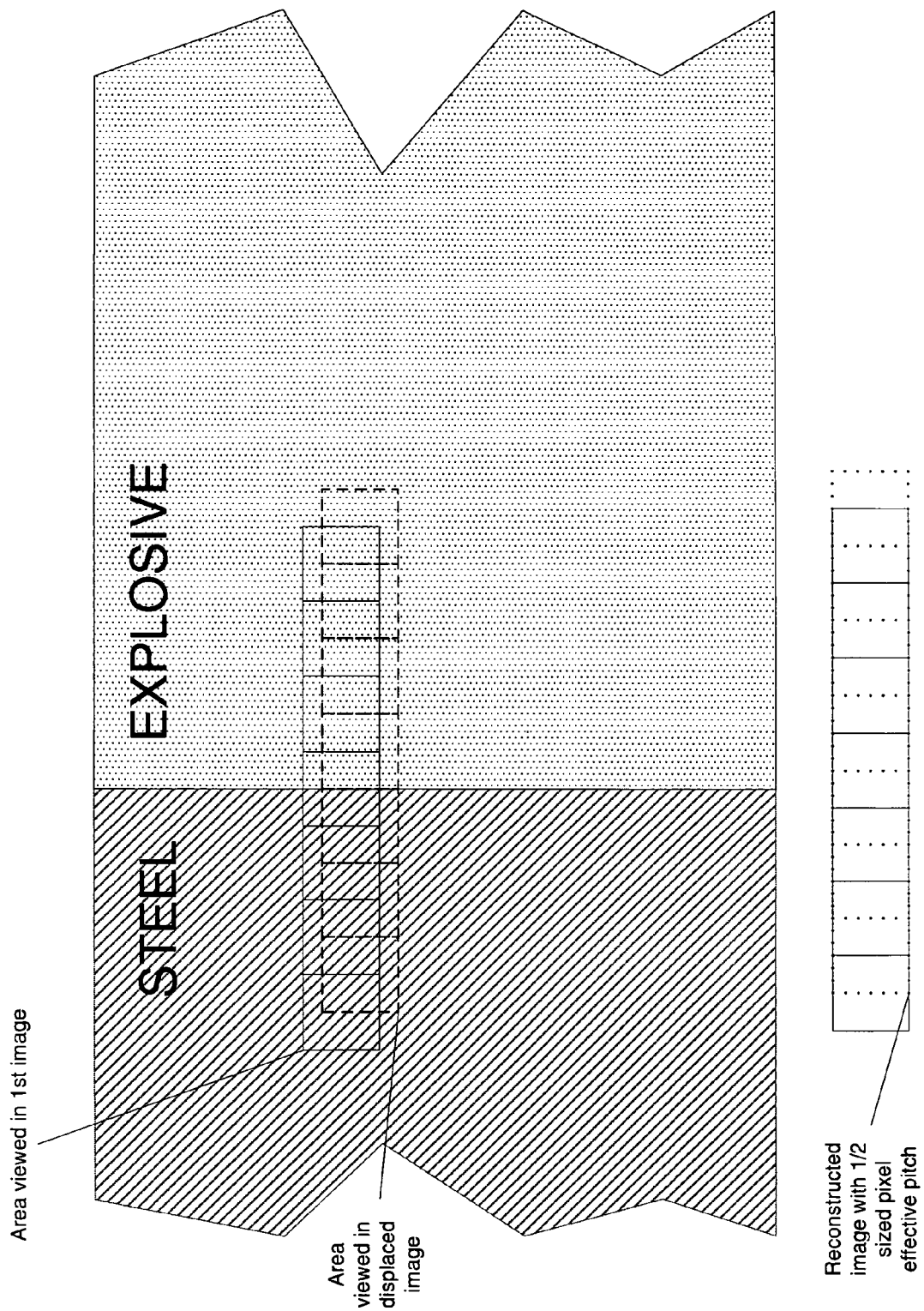
FIG. 24 shows an oversampled imaging method by which additional precision may be obtained by combining data from two discreetly separated images.
Figure 25:
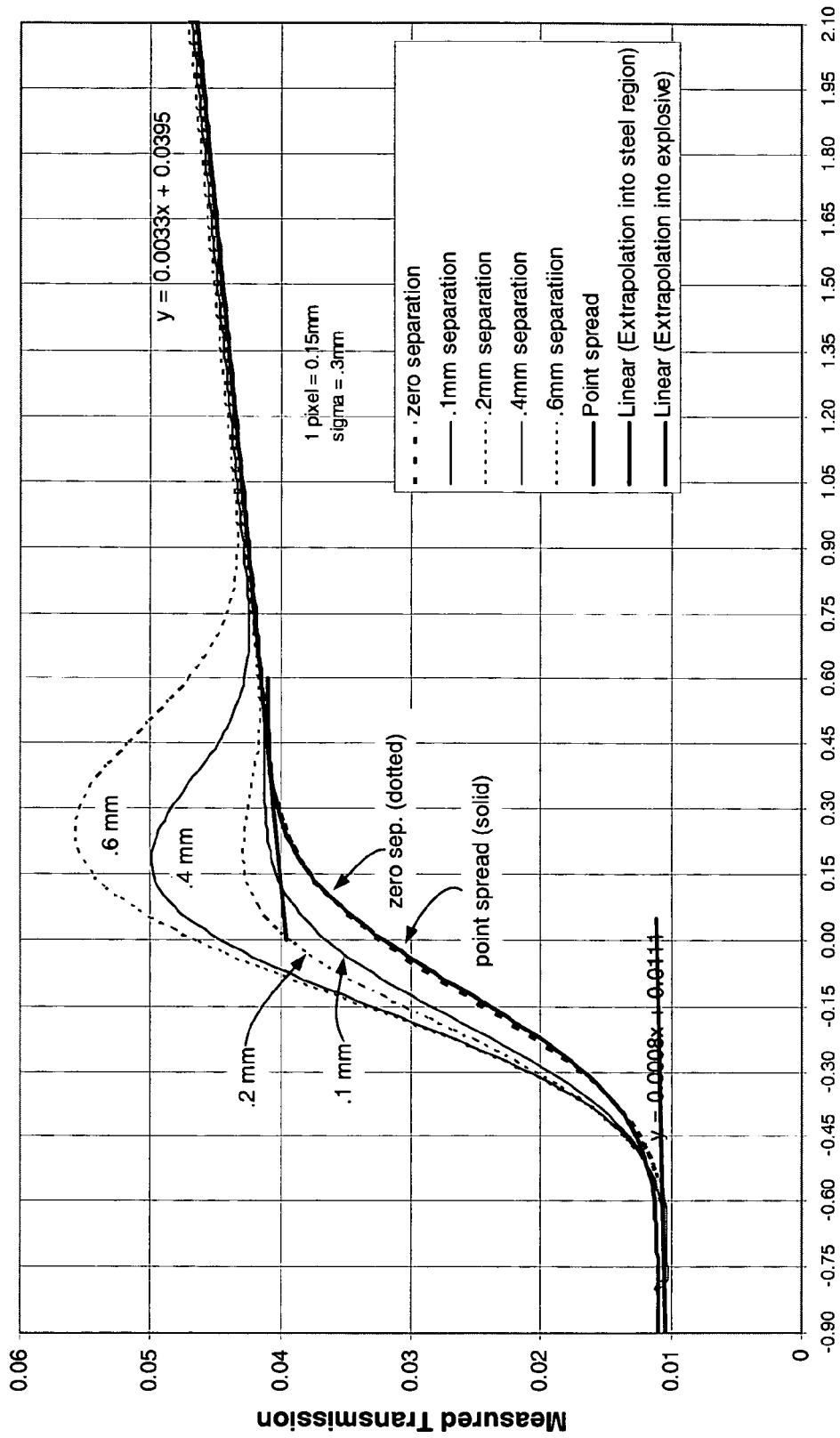
FIGS. 25 and 26 illustrate potential increase in measurement precision from the method of FIG. 24 when one oversamples the image pixel by combining two images shifted by ½ pixel displacement.
Figure 26:
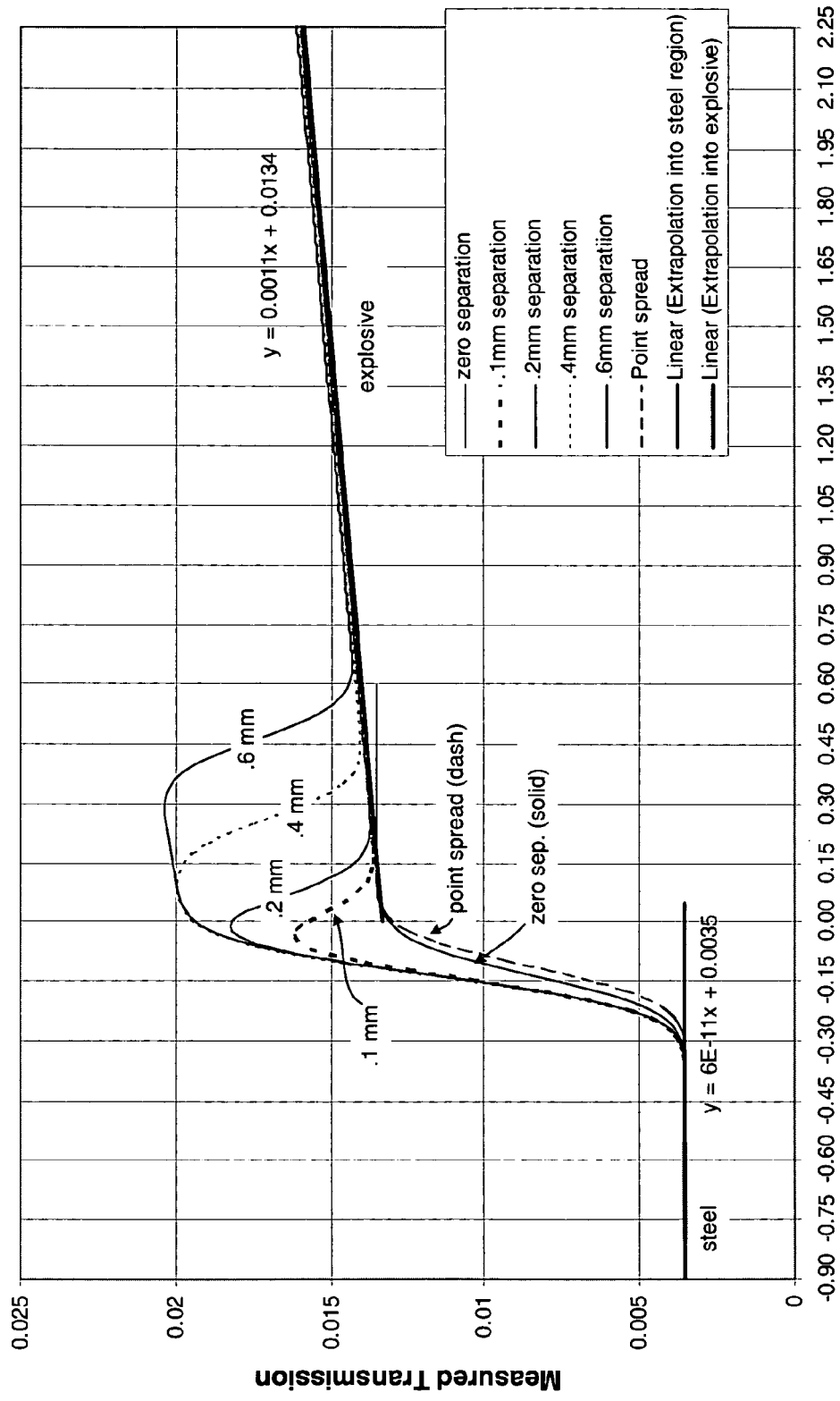

FIG. 24 shows an imaging method by which additional precision may be obtained. In particular, shell 110 is "oversampled" along the measurement axis of interest. In the described embodiments, the measurement axis is the separation axis (i.e., the longitudinal axis). For each longitudinal location, the shell is imaged twice. The second image overlaps the first image by one half pixel separation length. In FIG. 24, the overlapping pixel outlines are also displaced slightly perpendicular to the measurement axis to more clearly illustrate the concept. Using a simple interpolation, the two sets of data can be used to determine the values of the profile at the ½ pixel intermediate values. This new profile made from the successive pairs of overlapping data can be combined to provide a sharper image along the measurement axis since the sampling frequency has been doubled. The finer sampling pitch along the measurement axis reduces $\sigma$ in the imager point spread function by approximately one half. FIGS. 25 and 26 illustrate potential increase in measurement precision from the method shown in FIG. 24. FIG. 25, similar to FIG. 8, shows a set of expected data profiles (after convolution with an imager point spread function) for various separation distances in an ideal shell. FIG. 26 shows recalculation of the same profiles, but using a point spread function with a $\sigma$ value one half of the value used for the profiles of FIG. 25 (the scales of FIGS. 25 and 26 differ slightly). The improvements can be readily seen by comparing the 0.1 mm curves in FIGS. 25 and 26. The oversampling method of FIG. 24 can be combined with the method of FIGS. 13A and 13B, as well as with the method of FIGS. 23A and 23B.

Although specific examples of carrying out the invention have been described, those skilled in the art will appreciate that there are numerous variations and permutations of the above described systems and methods that fall within the spirit and scope of the invention as set forth in the appended claims. For example, the methods described herein can be readily implemented, using known programming techniques, in an automated computer program. A machine-readable medium could have machine-executable instructions stored thereon such that, when the instructions are read and executed by a computer processor or other appropriate device (or devices), steps of a method according to the invention are performed. These and other modifications are within the scope of the invention as defined by the attached claims.

The invention claimed is:

1. A method for increasing measurement precision in digital radiography, comprising:
    (a) receiving digital radiographic data for one or more objects in an actual condition;
    (b) creating a first data profile based on the received data, the first data profile corresponding to a selected region of the one or more objects and being associated with the actual condition;
    (c) deriving a second data profile from the received data, the second data profile representing an expected data profile for the one or more objects when in a reference condition;
    (d) calculating a difference between the first data profile created in step (b) and the second data profile derived in step (c); and
    (e) determining, based upon the calculated difference, a degree by which the actual condition varies from the reference condition in the selected region.

2. The method of claim 1, wherein step (c) comprises deriving the second data profile from the first data profile.

3. The method of claim 1, wherein the one or more objects comprise two objects having substantially dissimilar densities, and wherein the degree by which the actual condition varies from the reference condition corresponds to a linear separation between the two objects.

4. The method of claim 3, wherein the linear separation between the two objects is of the same order of magnitude as a major portion of a point spread function for an imager used to generate the data received in step (a).

5. The method of claim 1, wherein step (b) further comprises:
   (i) creating an initial data profile from pixel data values corresponding to a first portion of an area imaged by an imager, the first portion being generally coincident with the selected region,
   (ii) creating a normalizing data profile from pixel data values corresponding to a second portion of the area imaged by the imager, and
   (iii) normalizing the initial data profile by the normalizing data profile to yield a normalized data profile.

6. The method of claim 5, wherein step (c) comprises deriving the second data profile from the normalized data profile.

7. The method of claim 1, wherein the second data profile comprises a first section approximated by $$H\left[1 - \sum_{x=x_0}^{x_{final}} P(x, M, \sigma)\right],$$

and wherein:
   $P(x, M, \sigma)$ is a Gaussian point spread function for an imager used to generate the digital radiographic data received in step (a),
   x is a location along a measurement axis in the plane of an image of the one or more objects,
   M is the location of a boundary of one of the one or more objects,
   $\sigma$ is a standard deviation of the point spread function,
   $x_0$ and $x_{final}$ are locations along the measurement axis and located on opposite sides of the boundary of the one object, and
   H is a constant.

8. The method of claim 7, further comprising:
   (f) estimating M based on the maximum of the first derivative of the first data profile created in step (b).

9. The method of claim 8, further comprising:
   (g) calculating differences between the second data profile from step (c) using varying values for M and the first data profile from step (b); and
   (h) choosing, based on the differences calculated in step (g), an optimized value for M.

10. The method of claim 7, wherein the one or more objects comprise two objects having substantially dissimilar densities, wherein the degree by which the actual condition varies from the reference condition corresponds to a linear separation between the two objects, and further comprising:
   (f) deriving functions for lines corresponding to second and third sections of the second data profile on opposite sides of the first section along the measurement axis; and
   (g) fitting the first section to the second and third sections.

11. The method of claim 7, wherein step (e) comprises determining the degree by which the actual condition varies from the reference condition using a formula $m = [\Delta(m) - a_0 * R'(m)_{MAX} - b_0]/[a_1 * R'(m)_{MAX} + b_1]$, wherein:
   m is a distance along the measurement axis,
   $\Delta(m)$ is a difference between the first data profile and the second data profile,
   $R'(m)_{MAX}$ is the maximum of the first derivative of the first data profile, and
   $a_0$, $a_1$, $b_0$ and $b_1$ are constants.

12. The method of claim 11, wherein $a_0$, $a_1$, $b_0$ and $b_1$ are constants derived from measurements of test samples having known values for m.

13. The method of claim 1, wherein step (e) comprises comparing the calculated difference from step (d) with a lookup table, the lookup table comprising values for differences associated with known degrees of variation from the reference condition.

14. The method of claim 1, wherein step (a) comprises receiving data generated by creating successive sets of overlapping images.

15. A computer-readable medium having stored thereon data representing sequences of instructions which, when executed by a processor, cause the processor to perform steps comprising:
   (a) receiving digital radiographic data for one or more objects in an actual condition;
   (b) creating a first data profile based on the received data, the first data profile corresponding to a selected region of the one or more objects and being associated with the actual condition;
   (c) deriving a second data profile from the received data, the second data profile representing an expected data profile for the one or more objects when in a reference condition;
   (d) calculating a difference between the first data profile created in step (b) and the second data profile derived in step (c); and
   (e) determining, based upon the calculated difference, a degree by which the actual condition varies from the reference condition in the selected region.

16. The computer-readable medium of claim 15, wherein step (c) comprises deriving the second data profile from the first data profile.

17. The computer-readable medium of claim 15, wherein the one or more objects comprise two objects having substantially dissimilar densities, and wherein the degree by which the actual condition varies from the reference condition corresponds to a linear separation between the two objects.

18. The computer-readable medium of claim 17, wherein the linear separation between the two objects is of the same order of magnitude as a major portion of a point spread function for an imager used to generate the data received in step (a).

19. The computer-readable medium of claim 15, wherein step (b) further comprises:
   (i) creating an initial data profile from pixel data values corresponding to a first portion of an area imaged by an imager, the first portion being generally coincident with the selected region,
   (ii) creating a normalizing data profile from pixel data values corresponding to a second portion of the area imaged by the imager, and
   (iii) normalizing the initial data profile by the normalizing data profile to yield a normalized data profile.

20. The computer-readable medium of claim 19, wherein step (c) comprises deriving the second data profile from the normalized data profile.

21. The computer-readable medium of claim 15, wherein the second data profile comprises a first section approximated by $$H\left[1 - \sum_{x=x_0}^{x_{final}} P(x, M, \sigma)\right],$$

and wherein:
P(x,M,σ) is a Gaussian point spread function for an imager used to generate the digital radiographic data received in step (a),
x is a location along a measurement axis in the plane of an image of the one or more objects,
M is the location of a boundary of one of the one or more objects,
σ is a standard deviation of the point spread function,
$x_0$ and $x_{final}$ are locations along the measurement axis and located on opposite sides of the boundary of the one object, and
H is a constant.

22. The computer-readable medium of claim 21, comprising additional data representing sequences of instructions which, when executed by a processor, cause the processor to perform additional steps comprising:
(f) estimating M based on the maximum of the first derivative of the first data profile created in step (b).

23. The computer-readable of claim 22, comprising additional data representing sequences of instructions which, when executed by a processor, cause the processor to perform additional steps comprising:
(g) calculating differences between the second data profile from step (c) using varying values for M and the first data profile from step (b); and
(h) choosing, based on the differences calculated in step (g), an optimized value for M.

24. The computer-readable medium of claim 21, wherein the one or more objects comprise two objects having substantially dissimilar densities, wherein the degree by which the actual condition varies from the reference condition corresponds to a linear separation between the two objects, and comprising additional data representing sequences of instructions which, when executed by a processor, cause the processor to perform additional steps comprising:
(f) deriving functions for lines corresponding to second and third sections of the second data profile on opposite sides of the first section along the measurement axis; and
(g) fitting the first section to the second and third sections.

25. The computer-readable medium of claim 21, wherein step (e) comprises determining the degree by which the actual condition varies from the reference condition using a formula $m=[\Delta(m)-a_0*R'(m)_{MAX}-b_0]/[a_1*R'(m)_{MAX}+b_1]$, wherein:
m is a distance along the measurement axis,
Δ(m) is a difference between the first data profile and the second data profile,
$R'(m)_{MAX}$ is the maximum of the first derivative of the first data profile, and
$a_0$, $a_1$, $b_0$ and $b_1$ are constants.

26. The computer-readable medium of claim 25, wherein $a_0$, $a_1$, $b_0$ and $b_1$ are constants derived from measurements of test samples having known values for m.

27. The computer-readable medium of claim 15, wherein step (e) comprises comparing the calculated difference from step (d) with a lookup table, the lookup table comprising values for differences associated with known degrees of variation from the reference condition.

28. The computer-readable medium of claim 15, wherein step (a) comprises receiving data generated by creating successive sets of overlapping images.

29. A method for determining a linear separation distance between two objects having substantially dissimilar densities, comprising:
(a) receiving digital image data for the objects, the data created using an imager having a Gaussian point spread function with a standard deviation of the same order of magnitude as the separation distance;
(b) creating an initial data profile from a first set of pixel data values from the image data received in step (a), the first set of pixel data values corresponding to a first region of an area imaged by the imager;
(c) creating a normalizing data profile from a second set of pixel data values from the image data received in step (a), the second set of pixel data values corresponding to a second region of the image area;
(d) normalizing the initial data profile by the normalizing data profile to yield a normalized data profile;
(e) deriving a reference data profile from the normalized data profile, the reference data profile representing an expected data profile for the first region when the objects have a reference separation, the reference data profile having a first section approximated by $$H\left[1 - \sum_{x=x_0}^{x_{final}} P(x, M, \sigma)\right],$$

wherein:
P(x,M,σ) is the Gaussian point spread function for the imager,
x is a location along an axis of the separation between the objects,
M is the location of a boundary of one of the objects,
σ is the standard deviation of the imager point spread function,
$x_0$ and $x_{final}$ are linear locations along the separation axis and located on opposite sides of the boundary, and
H is a constant;
(f) estimating M based on the maximum of the first derivative of the normalized data profile;
(g) calculating differences between the reference data profile with varying values for M and the normalized data profile;
(h) choosing, based on the differences calculated in step (g), an optimized value for M;
(i) deriving functions for lines corresponding to second and third sections of the reference data profile on opposite sides of the first section along the separation axis;
(j) fitting the first section to the second and third sections; and
(k) determining the degree of variance from the reference separation using the formula $s=[\Delta(s)-a_0*R'(s)_{MAX}-b_0]/[a_1*R'(s)_{MAX}+b_1]$, wherein:
s is the object separation,
Δ(s) is a difference between the normalized data profile and the reference data profile,
$R'(s)_{MAX}$ is the maximum of the first derivative of the normalized data profile, and
$a_0$, $a_1$, $b_0$ and $b_1$ are constants derived from measurements of test samples having known separations.

* * * * *